(12) United States Patent
Bell et al.

(10) Patent No.: US 11,516,968 B2
(45) Date of Patent: Dec. 6, 2022

(54) AGRICULTURAL TOOLS FOR ASSISTING IN THE HARVESTING OF CROPS

(71) Applicant: Fox Max LLC, Keenesburg, CO (US)

(72) Inventors: Gregory William Bell, La Salle, CO (US); Wendy Rae Miller, La Salle, CO (US); Phillip Scott Shinbur, Keenesburg, CO (US)

(73) Assignee: Fox Max LLC, Greeley, CO (US)

( * ) Notice: Subject to any disclaimer, the term of this patent is extended or adjusted under 35 U.S.C. 154(b) by 287 days.

(21) Appl. No.: 16/549,590

(22) Filed: Aug. 23, 2019

(65) Prior Publication Data

US 2020/0060088 A1     Feb. 27, 2020

Related U.S. Application Data

(60) Provisional application No. 62/722,446, filed on Aug. 24, 2018.

(51) Int. Cl.
| | |
|---|---|
| *A01D 63/04* | (2006.01) |
| *A01D 41/14* | (2006.01) |
| *A01D 45/02* | (2006.01) |
| *A01D 41/06* | (2006.01) |
| *A01D 63/00* | (2006.01) |
| *B29C 41/04* | (2006.01) |

(52) U.S. Cl.
CPC .............. *A01D 63/04* (2013.01); *A01D 41/14* (2013.01); *A01D 41/06* (2013.01); *A01D 45/021* (2013.01); *A01D 63/00* (2013.01); *B29C 41/04* (2013.01)

(58) Field of Classification Search
CPC ...... A01D 63/04; A01D 41/14; A01D 45/021; A01D 63/00; A01D 41/06; A01D 41/04
See application file for complete search history.

(56) References Cited

U.S. PATENT DOCUMENTS

| | | | | |
|---|---|---|---|---|
| 2,252,377 | A * | 8/1941 | Hyman | A01D 45/021 56/119 |
| 4,403,467 | A * | 9/1983 | Baugh | A01D 45/021 56/106 |
| 4,550,555 | A * | 11/1985 | Rohlik | A01D 63/00 56/314 |
| 4,700,537 | A * | 10/1987 | Emmert | A01D 63/04 56/119 |
| 5,195,309 | A * | 3/1993 | Mossman | A01D 43/082 56/105 |
| 5,787,697 | A * | 8/1998 | Post | A01D 45/021 56/119 |
| 5,910,092 | A * | 6/1999 | Bennett | A01D 45/021 56/119 |
| 6,143,230 | A * | 11/2000 | Andrios | B29C 33/56 264/306 |
| 6,247,297 | B1 * | 6/2001 | Becker | A01D 45/021 56/119 |
| 9,226,447 | B2 * | 1/2016 | Noll | A01D 41/148 |
| D913,342 | S * | 3/2021 | Coon | D15/28 |

(Continued)

*Primary Examiner* — Arpad Fabian-Kovacs
(74) *Attorney, Agent, or Firm* — Weatherly IP Solutions, LLC; Barbara Campbell

(57) ABSTRACT

A combine header having a snout extension with a flat bottom surface base component converging toward each other, a cover arching over the base component and conforming to and at least as wide as the snout. Connecting plates on opposite sides of the snout extension tool attaching the snout extension tool to the snout.

13 Claims, 32 Drawing Sheets

(56) References Cited

U.S. PATENT DOCUMENTS

| | | | | |
|---|---|---|---|---|
| 2003/0037528 A1* | 2/2003 | Glazik | ............... | A01D 63/04 |
| | | | | 56/119 |
| 2004/0107684 A1* | 6/2004 | Slabbinck | ............ | A01D 63/00 |
| | | | | 56/119 |
| 2012/0042624 A1* | 2/2012 | Lohrentz | ............ | A01D 45/021 |
| | | | | 56/119 |
| 2014/0075908 A1* | 3/2014 | Surmann | ............ | A01D 45/021 |
| | | | | 56/119 |
| 2014/0298769 A1* | 10/2014 | Walker | ............. | A01D 45/021 |
| | | | | 56/119 |
| 2015/0068180 A1* | 3/2015 | Lohrentz | ............. | B29C 41/04 |
| | | | | 56/119 |
| 2015/0101303 A1* | 4/2015 | Priepke | ............. | A01D 45/021 |
| | | | | 56/119 |
| 2016/0183466 A1* | 6/2016 | Long | ............... | A01D 45/021 |
| | | | | 56/119 |
| 2020/0323132 A1* | 10/2020 | Walker | ............. | A01D 45/021 |

\* cited by examiner

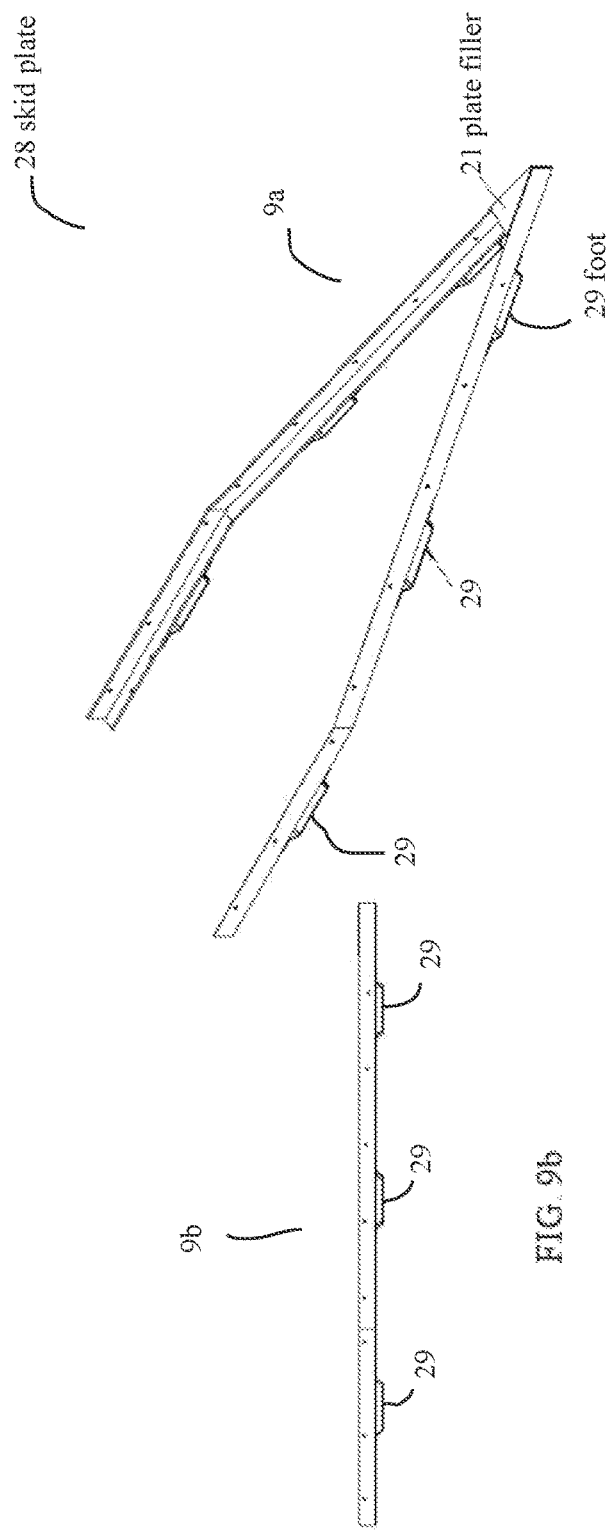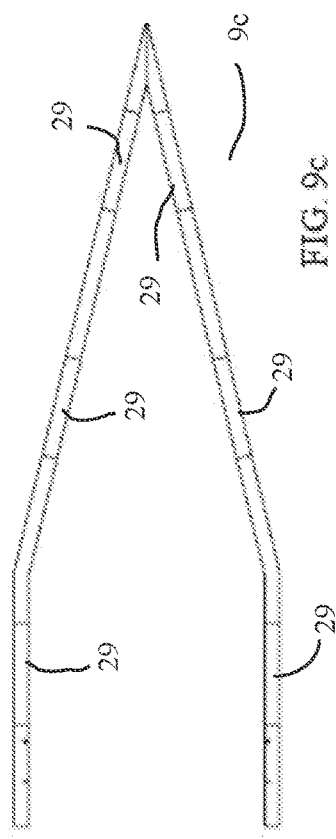
FIGs. 9a-9c

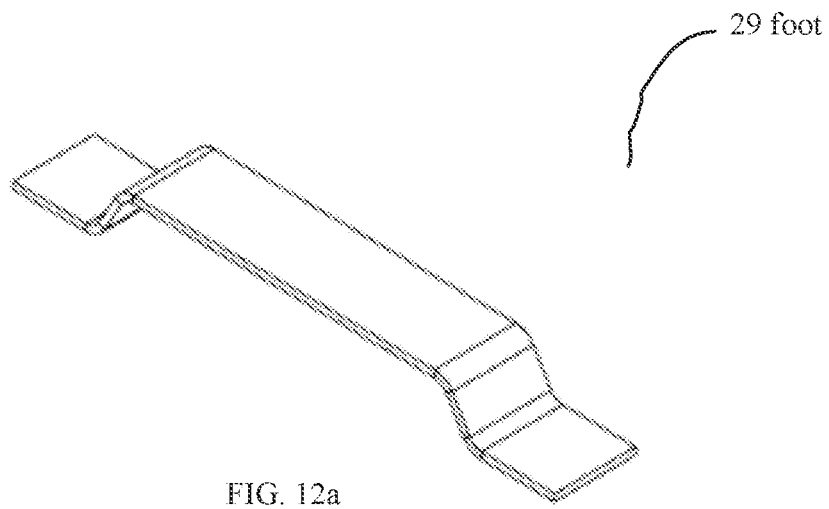
FIG. 12a
FIG. 12b
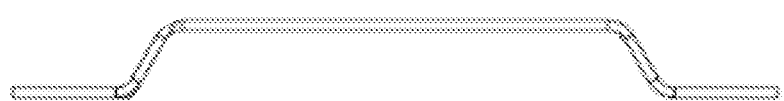
FIG. 12c
FIGs. 12a-12c

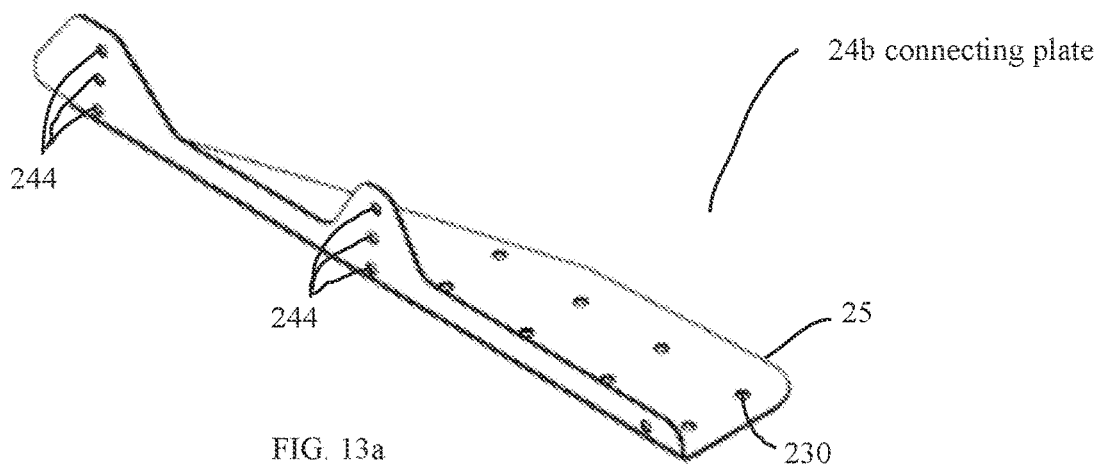
FIG. 13a
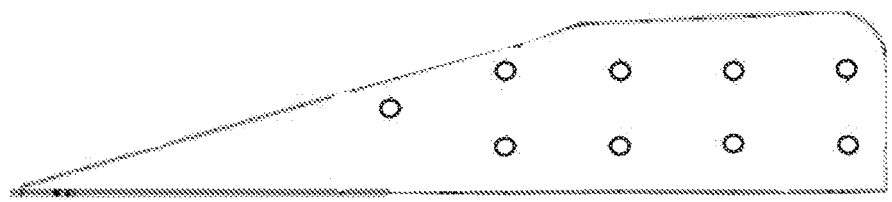
FIG. 13b
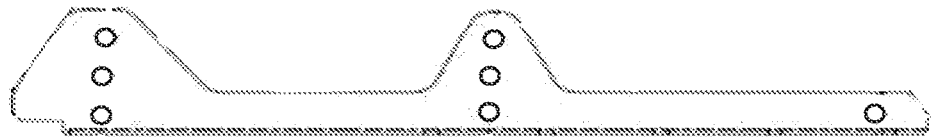
FIG. 13c
FIG. 13d
FIGs. 13a-13d

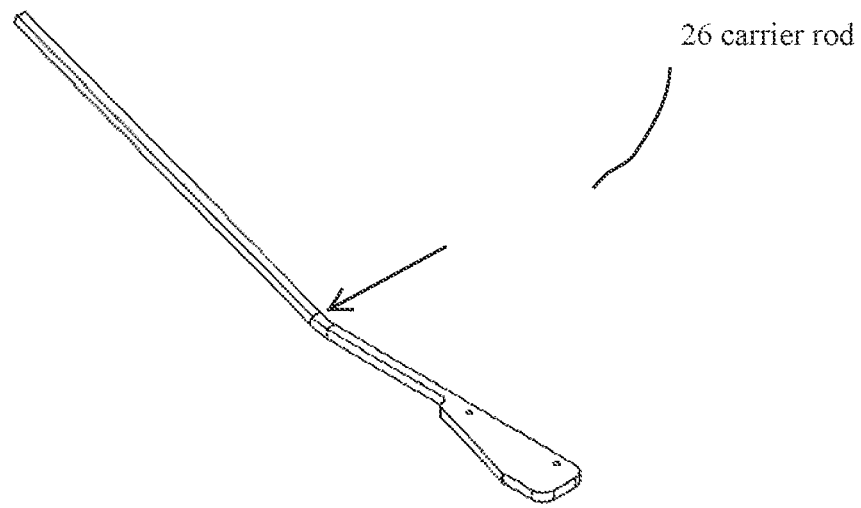
FIG. 14a
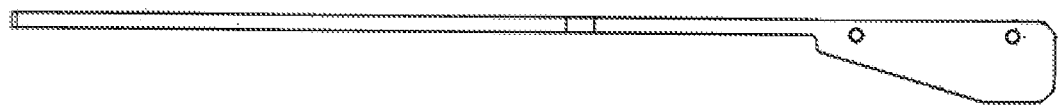
FIG. 14b
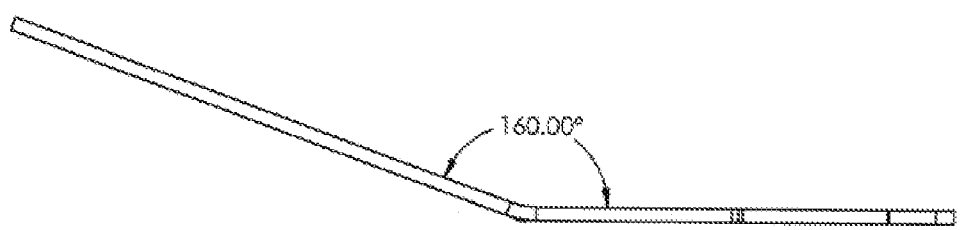
FIG. 14c
FIGs. 14a-14c

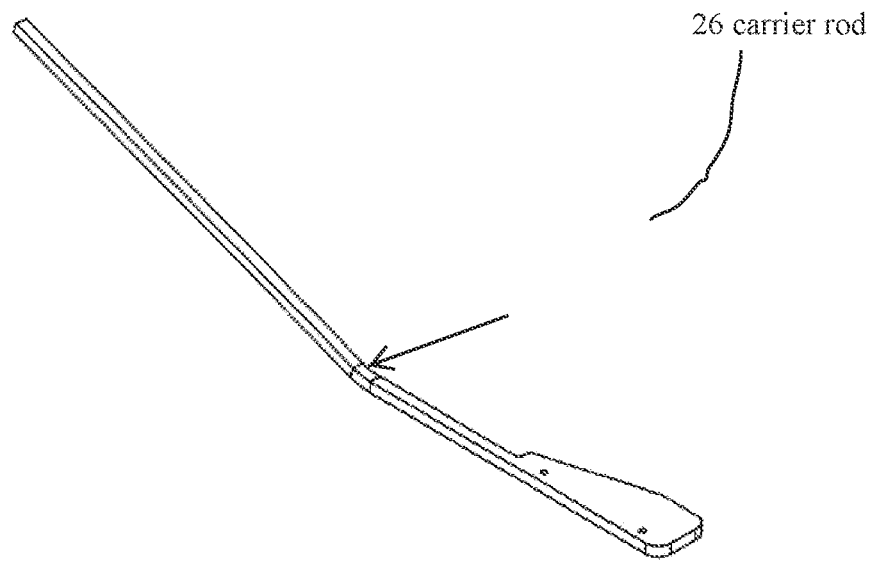
FIG. 15a
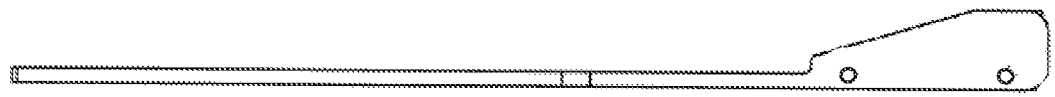
FIG. 15b
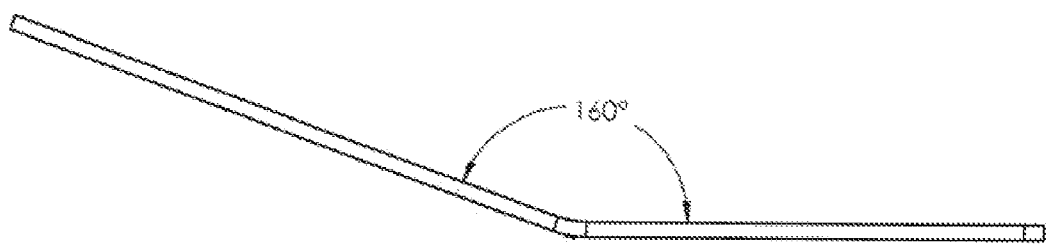
FIG. 15c
FIGs. 15a-15c

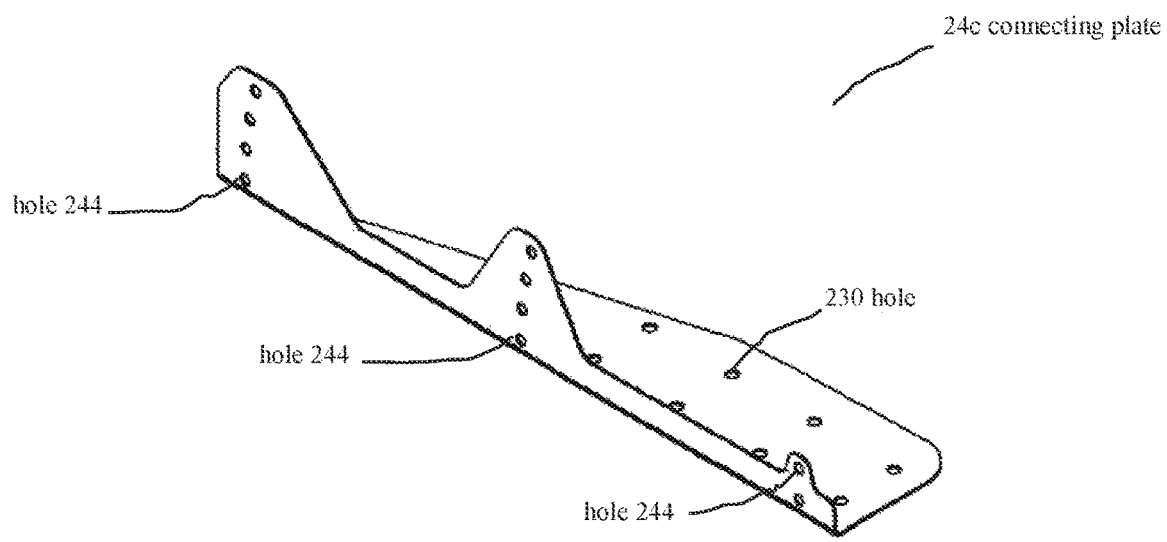
FIG. 17a
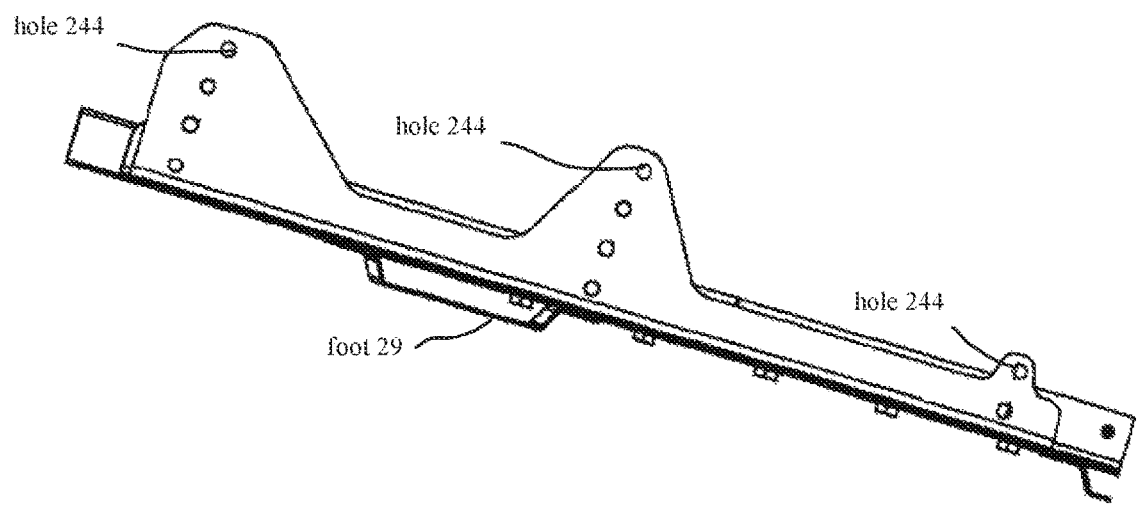
FIG. 17b
FIGs. 17a-17b

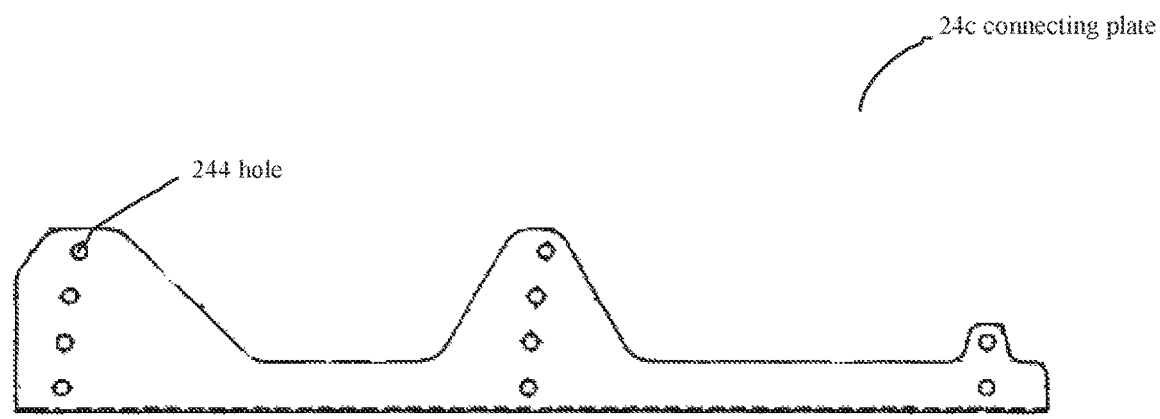
FIG. 17c
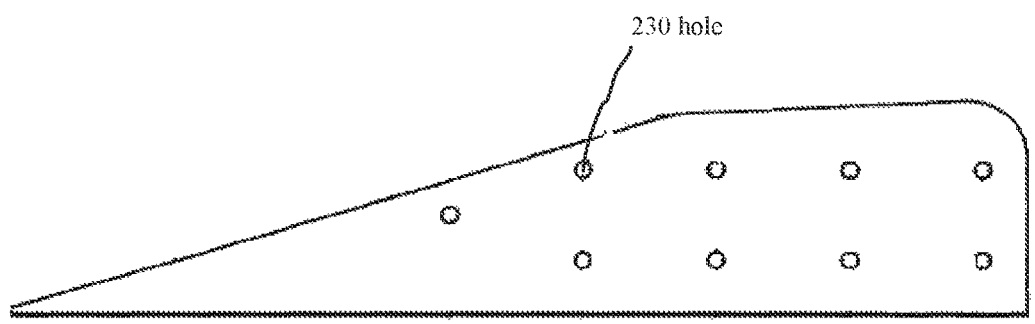
FIG. 17d
FIGs. 17c-17d

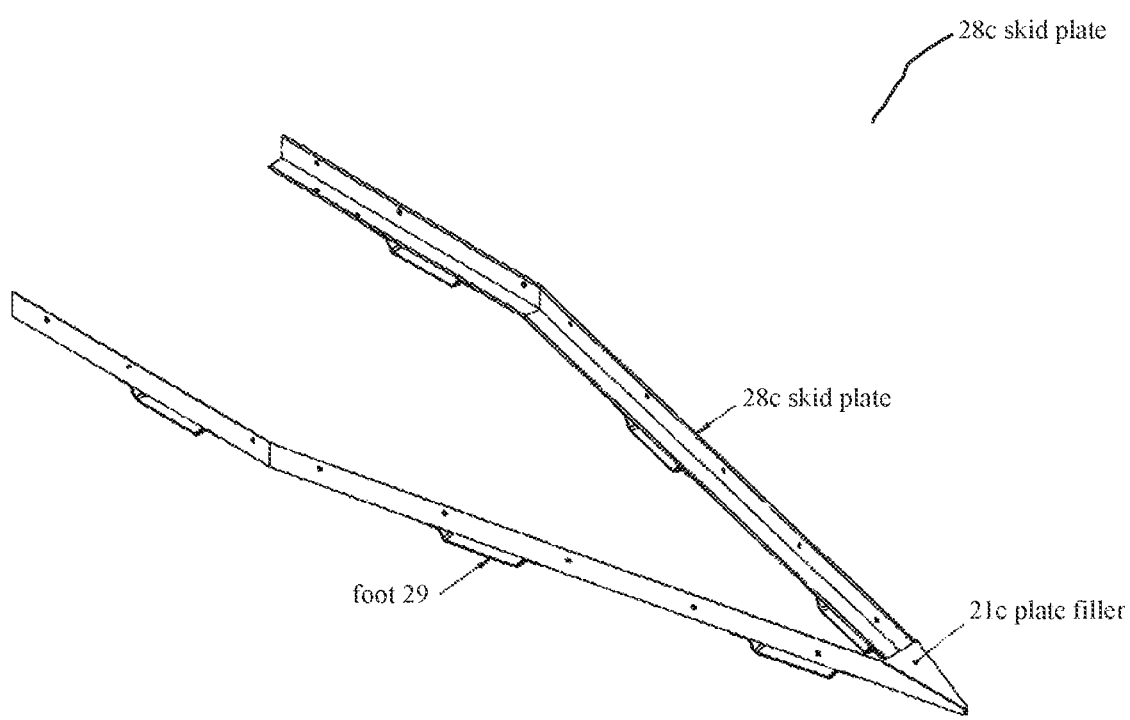
FIG. 18a
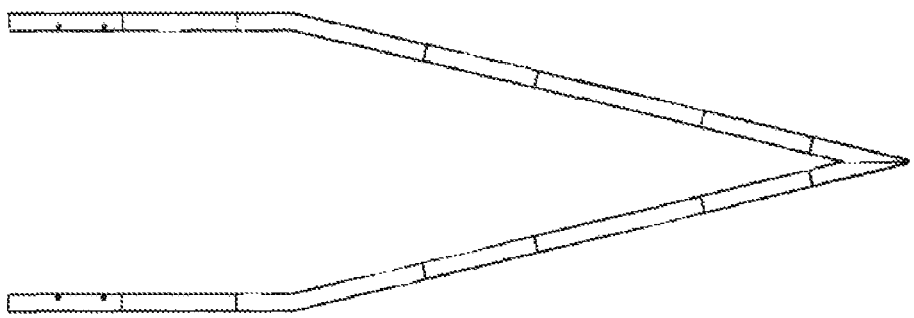
FIG. 18b
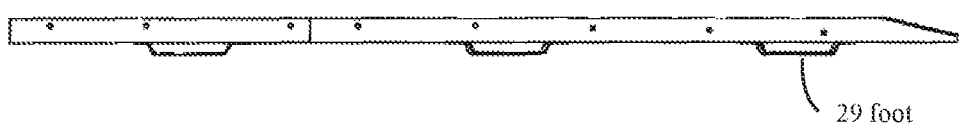
FIG. 18c
FIGs. 18a-18c

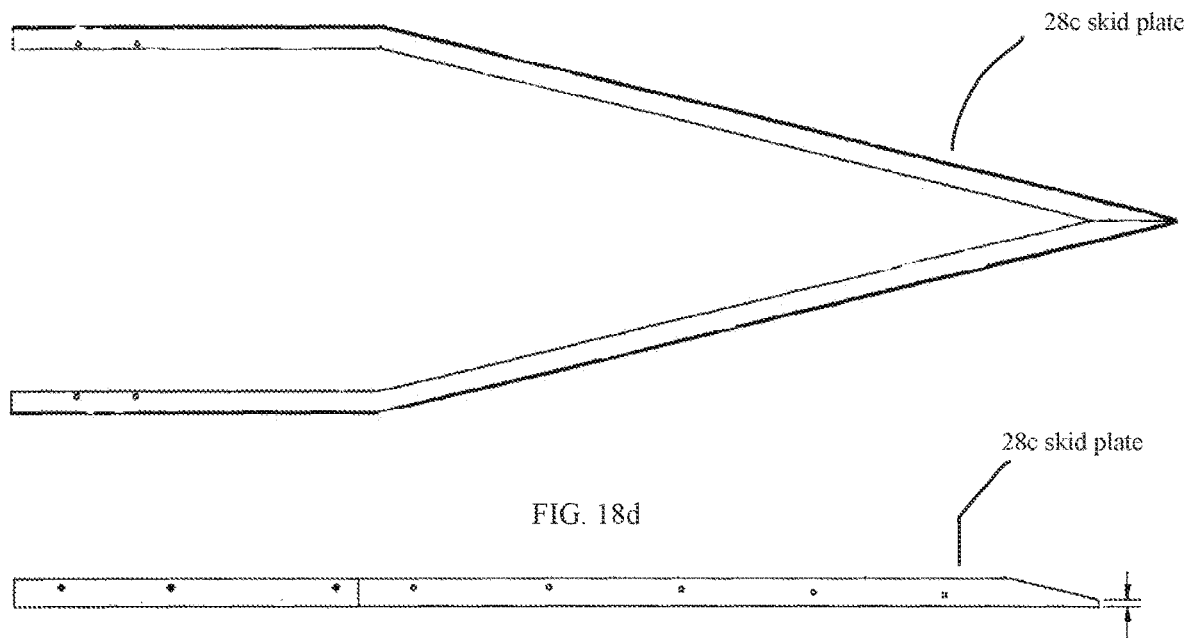
FIG. 18d
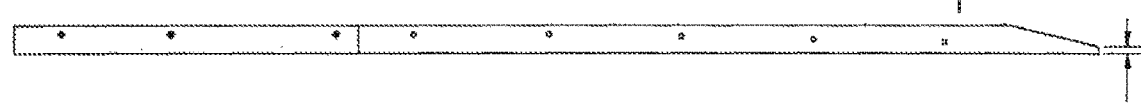
FIG. 18e
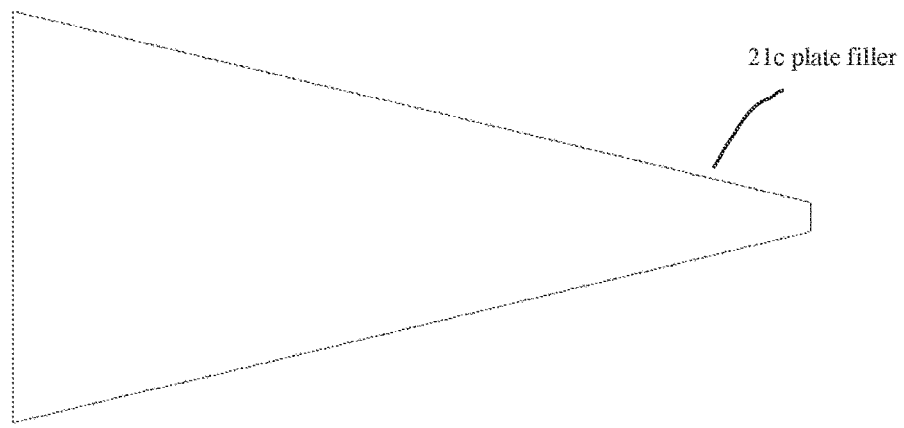
FIG. 18f
FIGs. 18d-18f

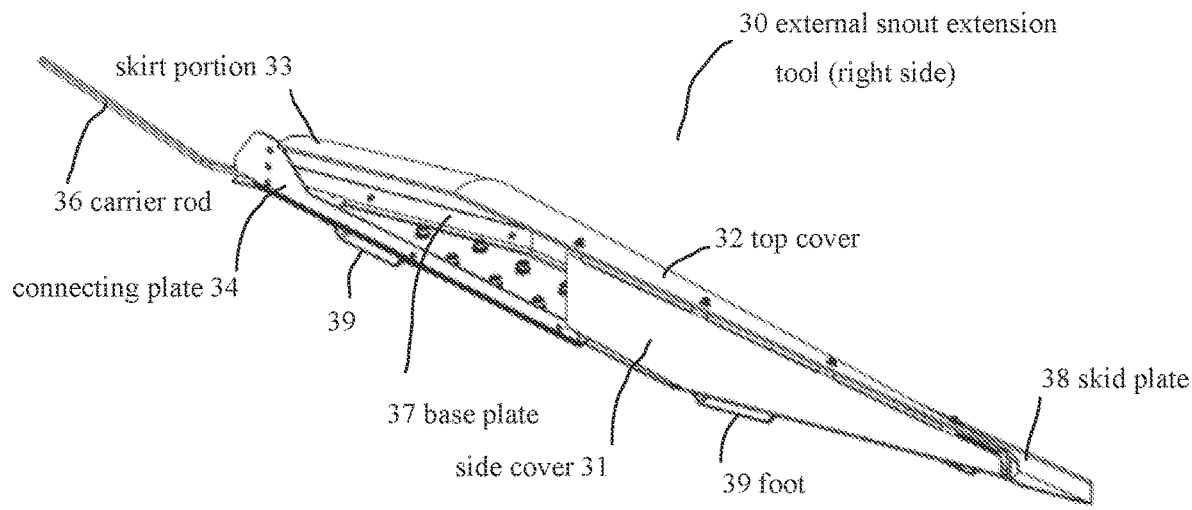
FIG. 19a
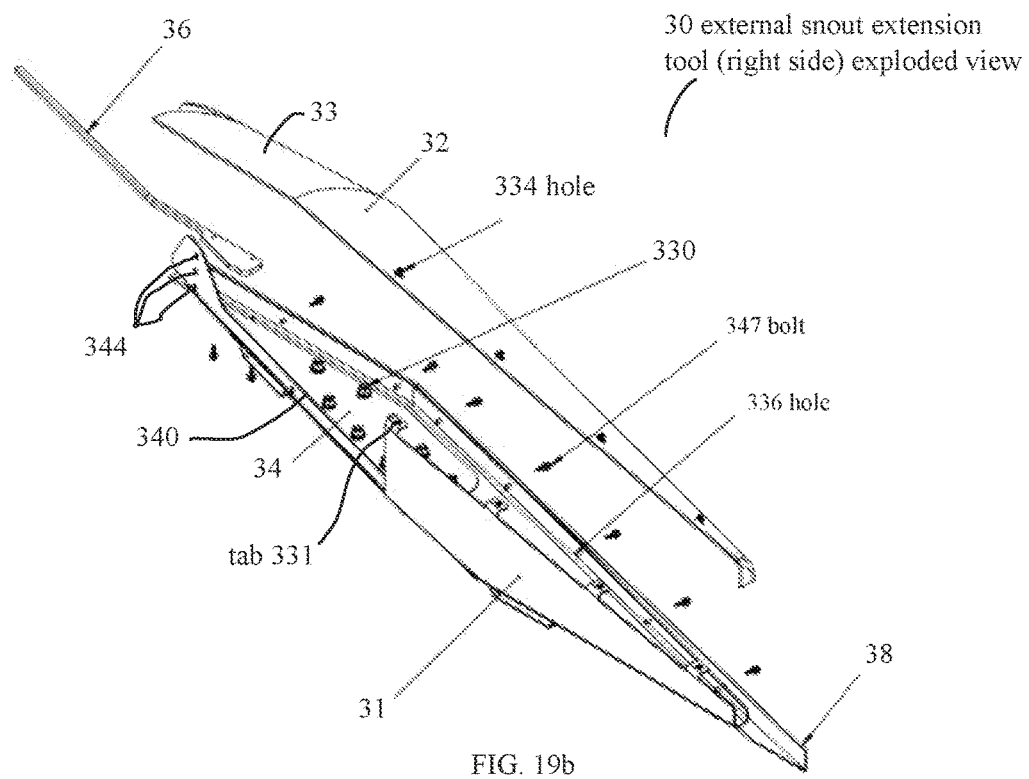
FIG. 19b
FIGs. 19a-19b

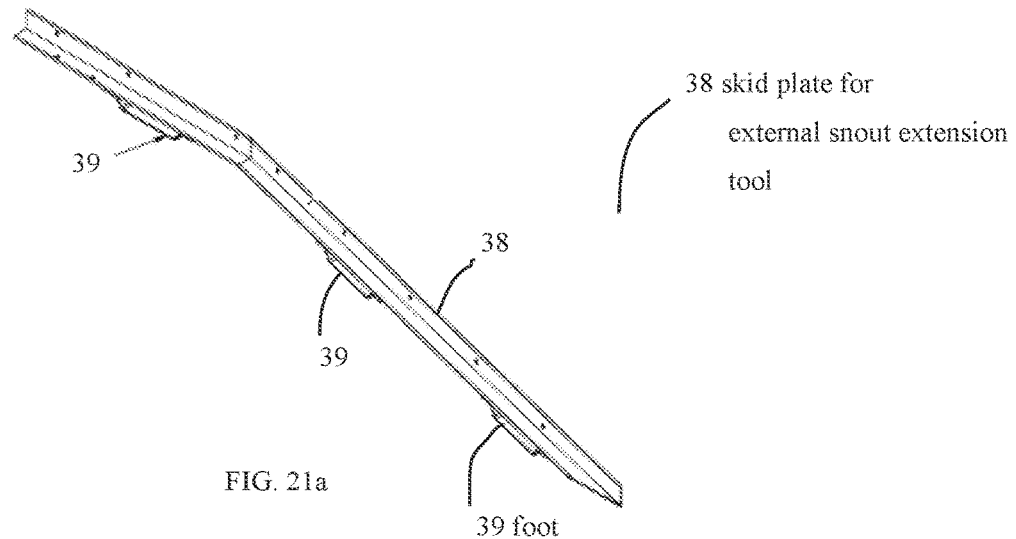
38 skid plate for external snout extension tool
FIG. 21a
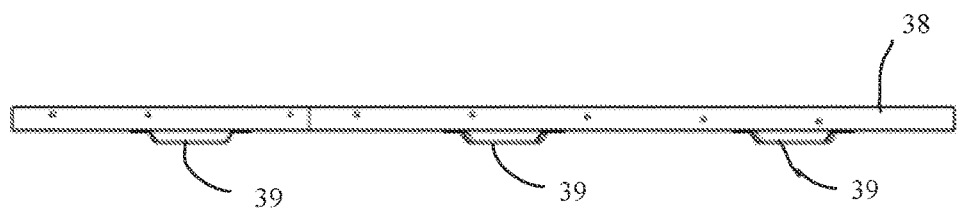
FIG. 21b
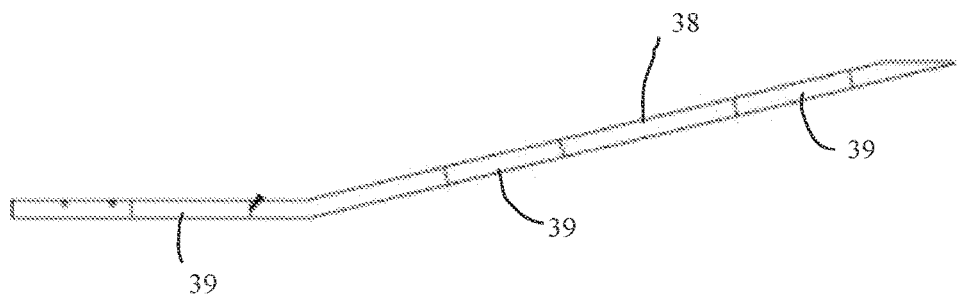
FIG. 21c
FIGs. 21a-21c

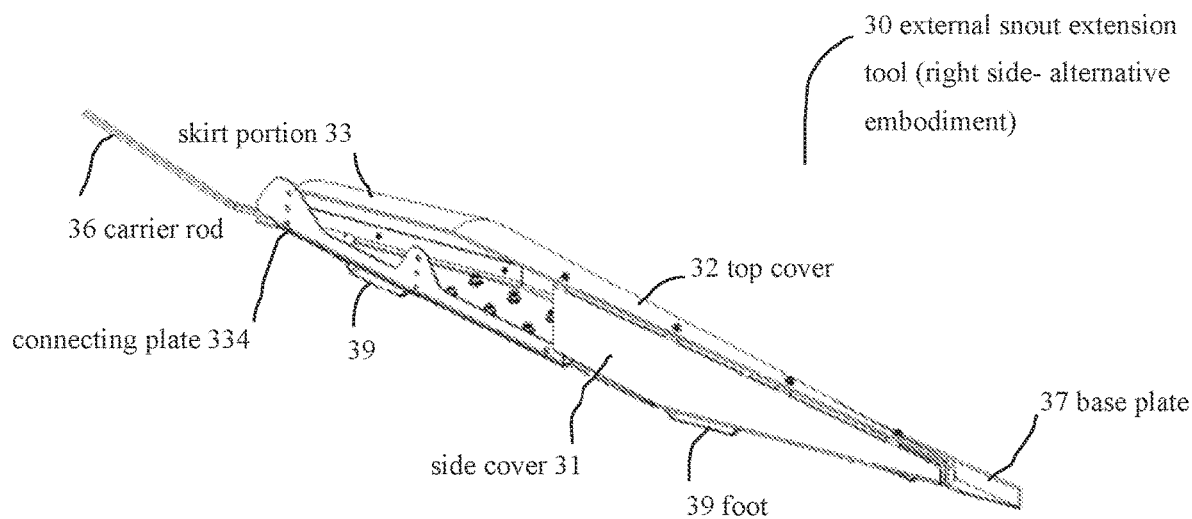
FIG. 22a
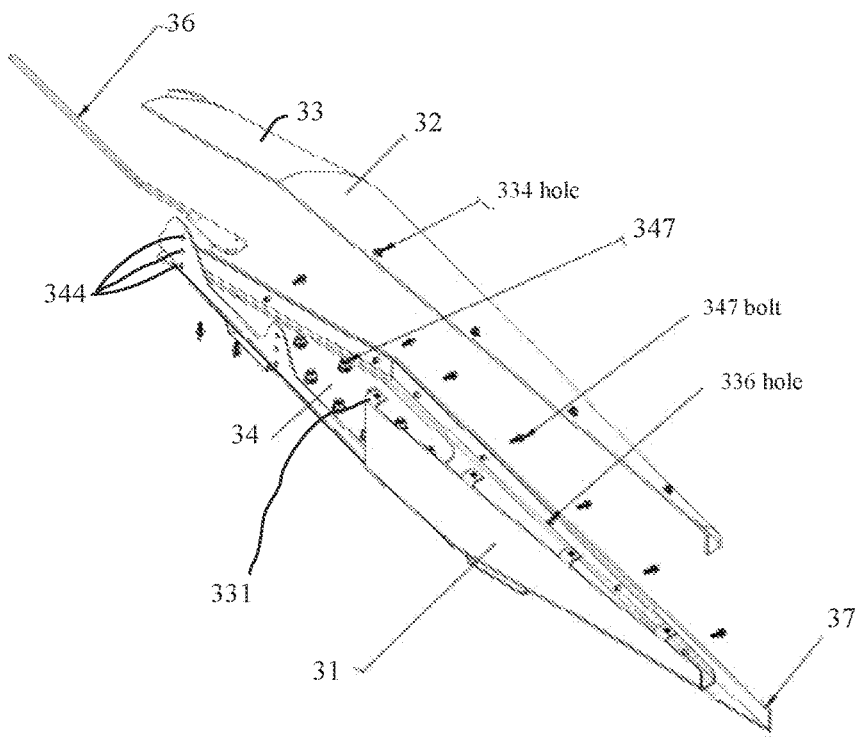
FIG. 22b
FIGs. 22a-22b

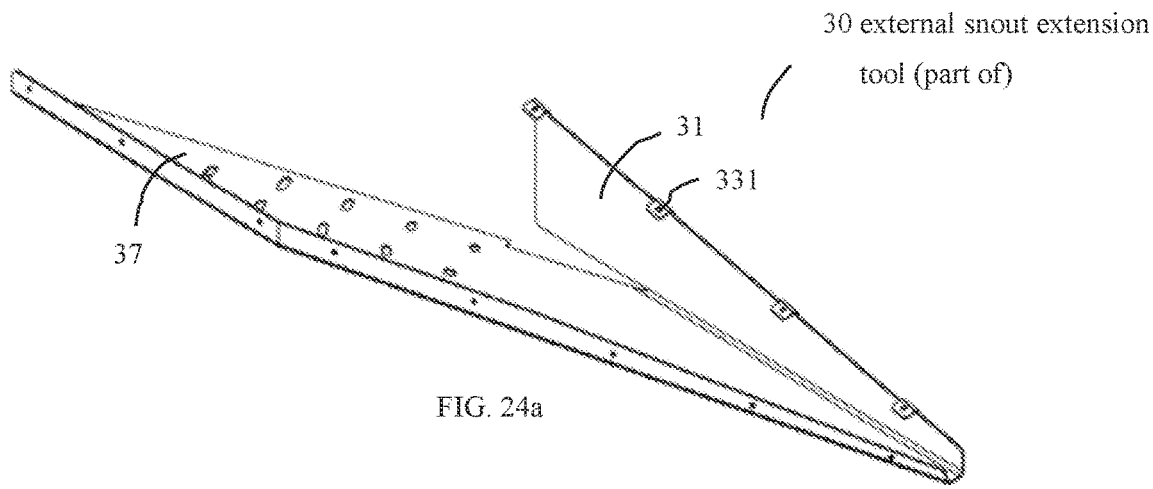
FIG. 24a
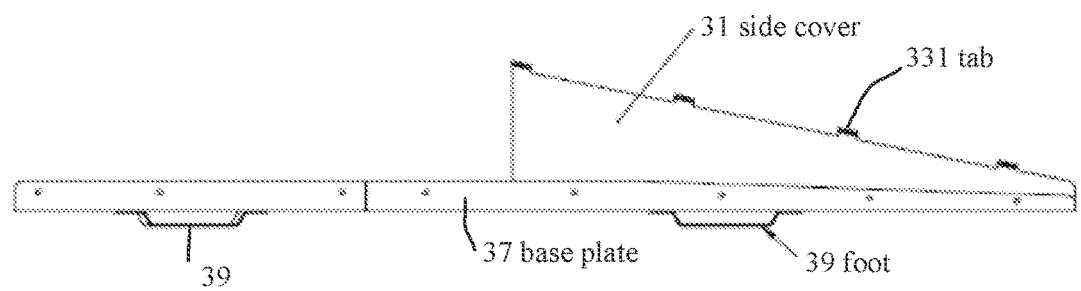
FIG. 24b
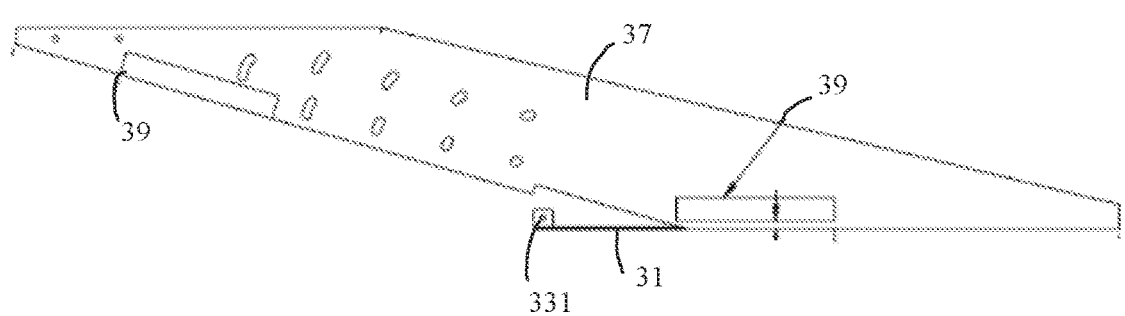
FIG. 24c
FIGs. 24a-24c

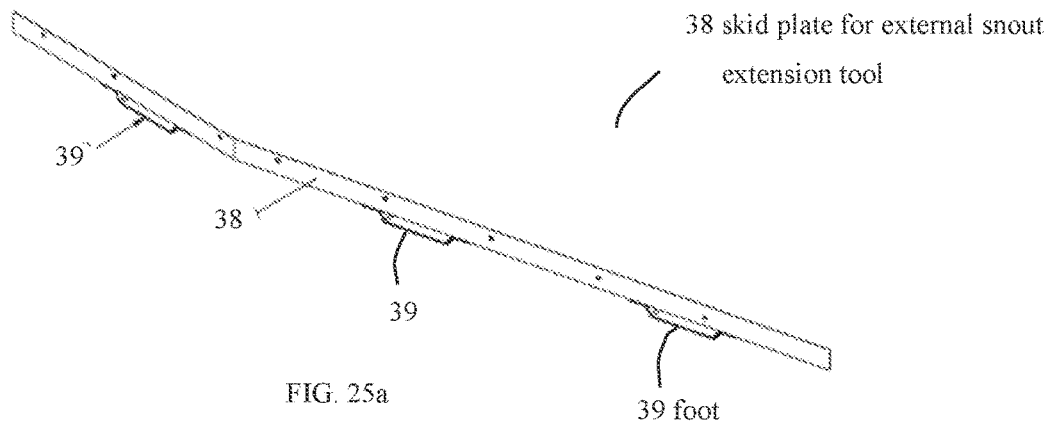
FIG. 25a
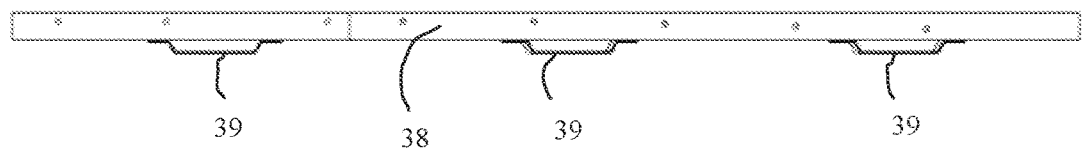
FIG. 25b
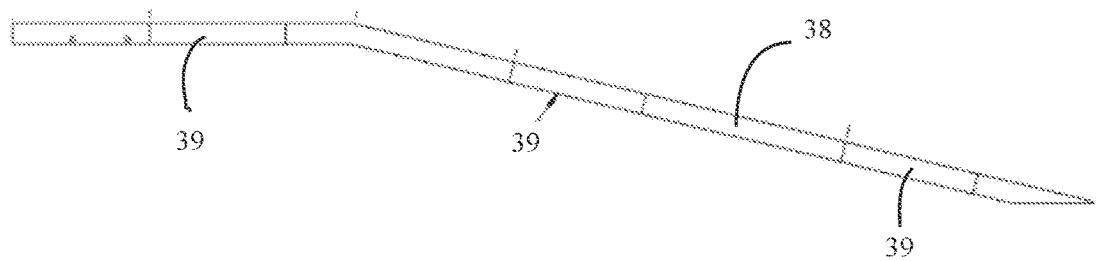
FIG. 25c
FIGs. 25a-25c

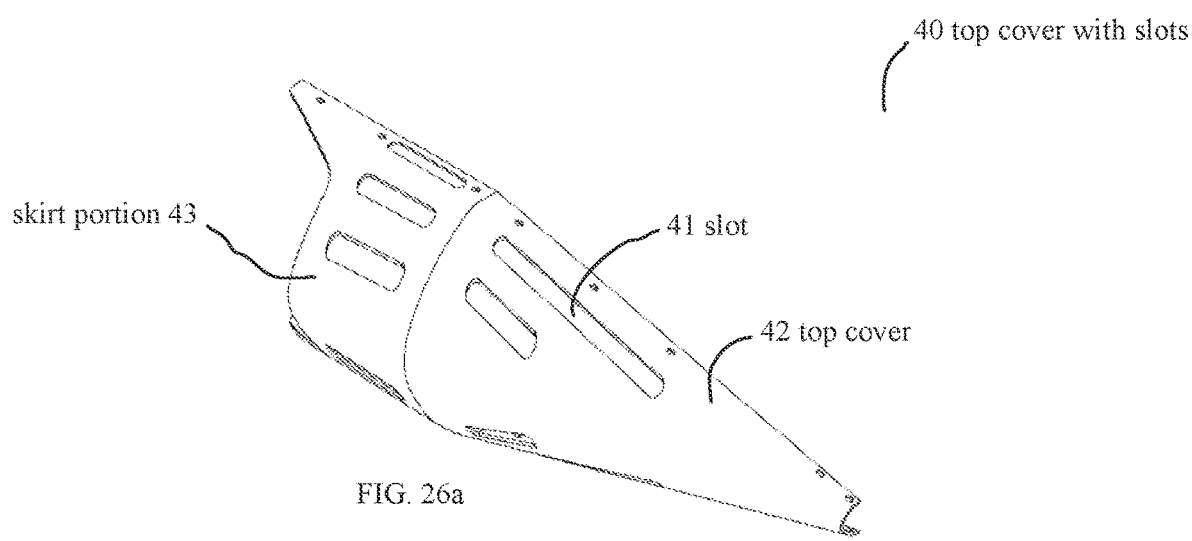
FIG. 26a
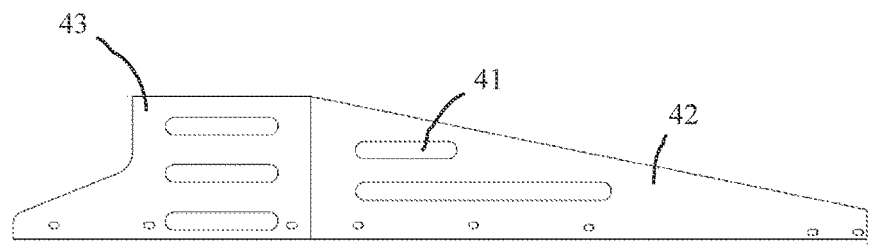
FIG. 26b
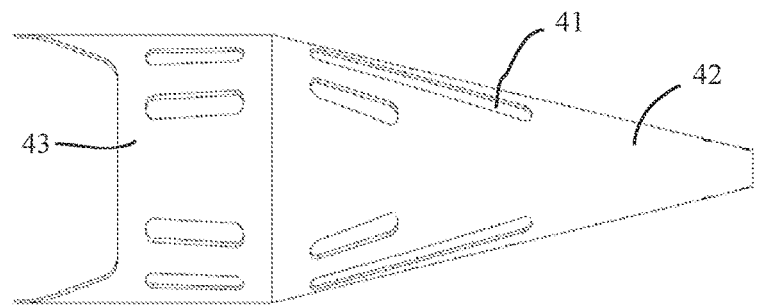
FIG. 26c
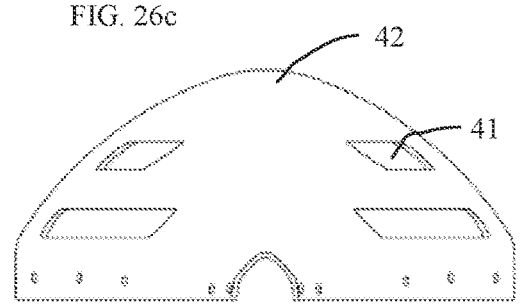
FIG. 26d
FIGs. 26a-26d

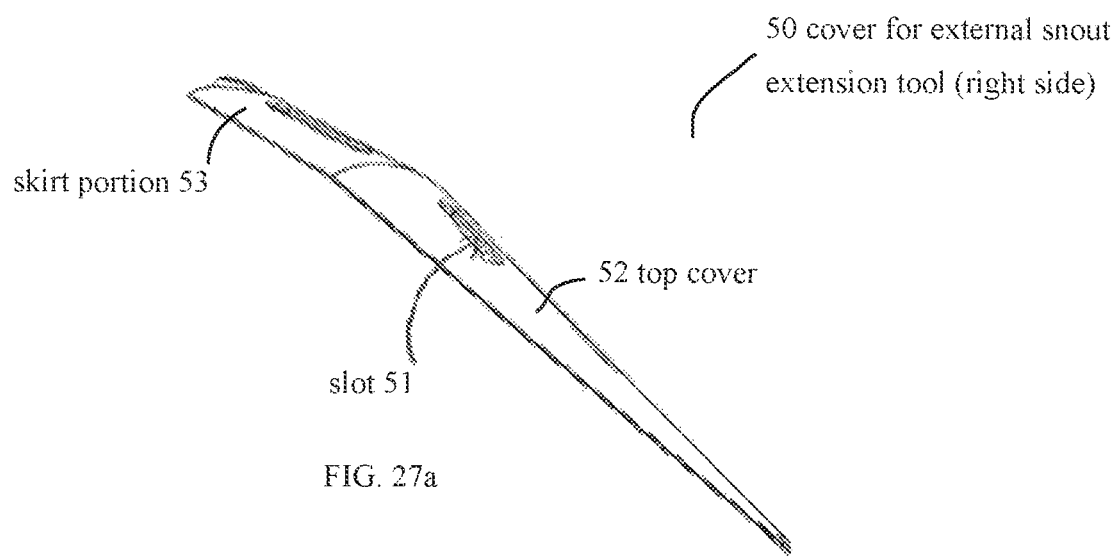
FIG. 27a
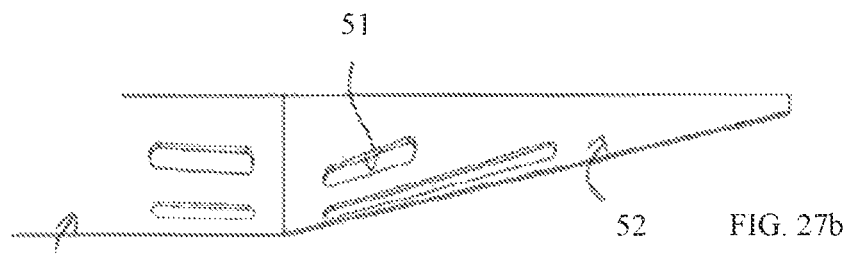
FIG. 27b
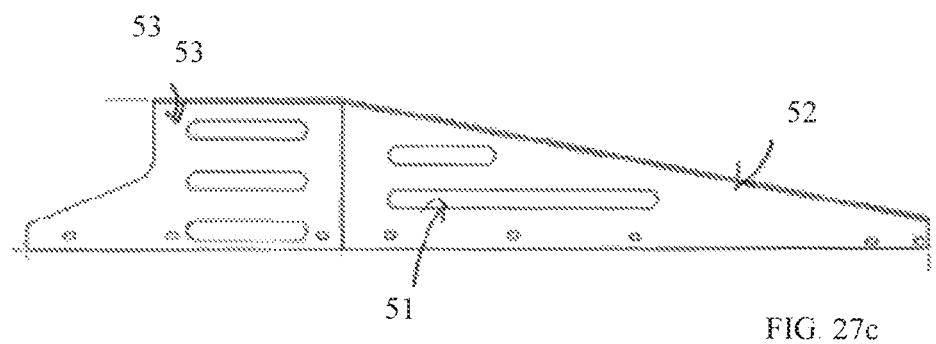
FIG. 27c
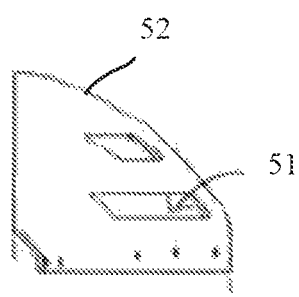
FIG. 27d
FIGs. 27a-27d

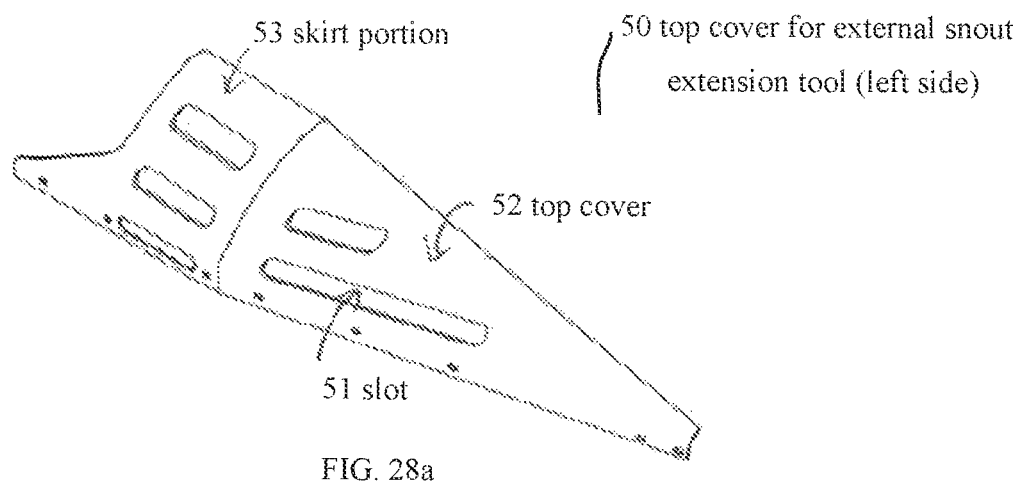
FIG. 28a
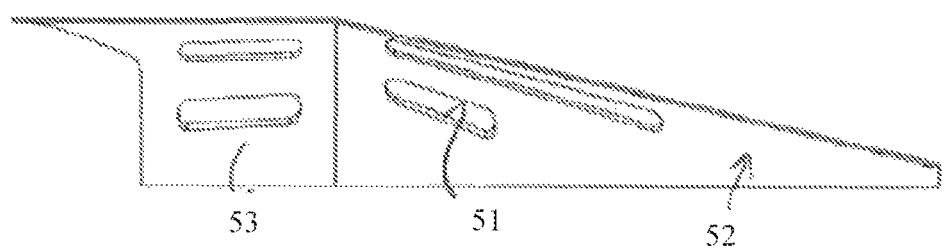
FIG. 28b
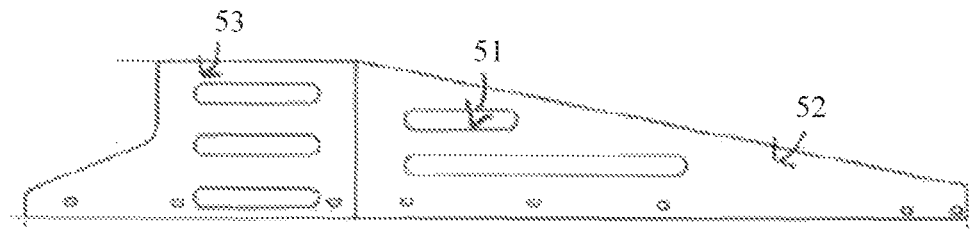
FIG. 28c
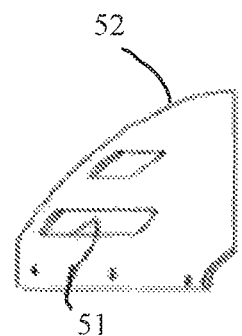
FIG. 28d
FIGs. 28a-28d

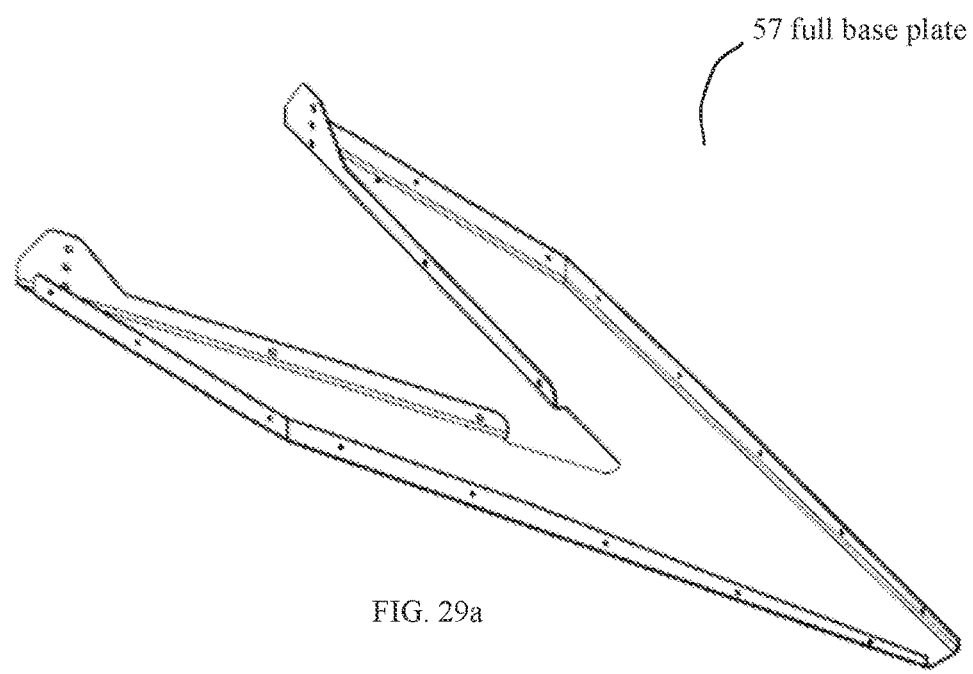
FIG. 29a
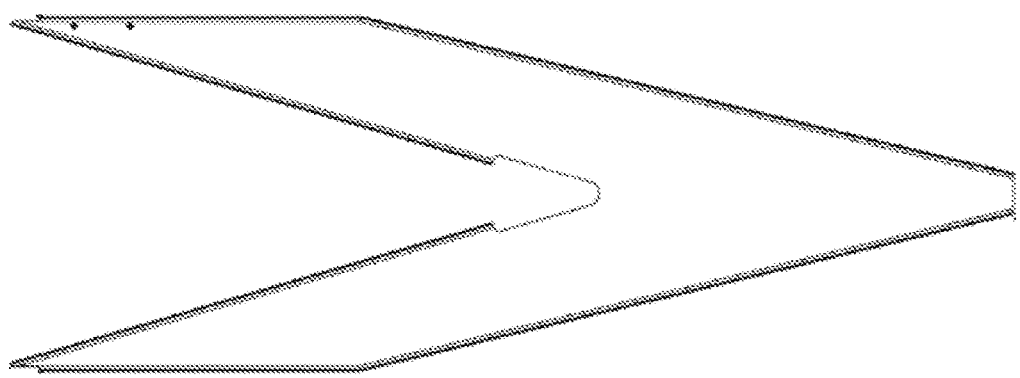
FIG. 29b
FIG. 29c
FIGs. 29a-29c

AGRICULTURAL TOOLS FOR ASSISTING IN THE HARVESTING OF CROPS

CROSS-REFERENCE TO RELATED APPLICATIONS

The present application claims the benefit of priority of U.S. Provisional Application No. 62/722,446 filed Aug. 24, 2018, the contents of which is hereby incorporated by reference in its entirety.

BACKGROUND

Ripe grain crops, including, but not limited to, wheat, oats, sunflower, rye, barley, corn (maize), sorghum, soybeans, edible beans, flax (linseed), sunflowers, and canola, are typically and traditionally harvested in three operations, i.e., reaping, threshing, and winnowing. Combines are well-known agricultural machines that are designed to perform all three of those harvesting operations together, thus can harvest large areas of crops very efficiently with minimal human labor. The reaping operation performed by a combine is typically performed by a component of the combine called the "head," which cuts or otherwise severs the heads, ears, pods, or other seed-bearing portion of a grain plant from the stalks of the plants and feeds those seed-bearing portions into the threshing component of the combine. The threshing component of the combine mechanically separates the grain seeds from the remaining portions of the grain plant, which is commonly called chaff, and the winnowing component of the combine blows air through the seed and chaff mixture to blow the chaff away from the grain seeds. The grain seeds are then collected and saved.

Some grains have different kinds of stalks than other kinds of grains, and a combine head that is designed to reap one kind of grain effectively and efficiently may not reap another kind of grain effectively or efficiently. For example, combine heads are available in a number of different configurations designed for efficient reaping of one or more kinds of grains. For example, corn heads or heads with snouts, are specially designed with elongated snouts, sometimes also called points or fingers, extending forwardly from gathering chains, snapping rolls, or cutters in parallel, spaced-apart relation to each other to guide corn stalks into the gathering chains, snapping rolls, or cutters. Some combine heads also have such elongate snouts, but other combine heads as well as small grain heads may have sickle bars for cutting the stalks and reels for standing plants up and pushing cut plants onto a platform of the head to then be fed by an auger or by a draper into a feeder housing that feeds the cut grain into the threshing component of the combine.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods, which are meant to be examples and illustrative, not limiting in scope. In various embodiments, one or more of the above-described problems have been reduced or eliminated, while other embodiments are directed to other improvements.

One example embodiment relates to a snout extension tool for extending a snout of a combine header, comprising a base component with a substantially flat bottom surface and a length extending between a proximal end and a distal end with opposite lateral edges that converge toward each other at the distal end of the base component; a cover component that arches over the base component and that has opposite lateral edges which extend from a proximal end of the cover component where the lateral edges of the cover component are at least as wide as the snout of the combine header and converge toward each other at a distal end of the cover component in a profile that conforms to the lateral edges of the base component, and wherein the lateral edges of the cover component are connected with the lateral edges of the base component so that the cover component and the base component have a space between them that is open adjacent to the proximal ends of the base component and the cover component and that converges toward the distal ends of the base component and the cover component, and, further, wherein the proximal end of the cover component arches over the base component a sufficient amount to provide the open proximal end of the space of a size that conforms substantially to the snout of the combine header; and connecting plates on opposite sides of the snout extension tool adjacent the proximal ends of the base component and the cover component with attachment means on the connecting plates on the opposite sides of the snout extension tool that are adapted to connect the snout extension tool to the snout of a combine in a pivotal manner that is pivotal about a horizontal axis.

In one example embodiment, at least one snout extension tool, either to be mounted on an internal snout or an external snout, is mounted onto the appropriate conventional snout, an internal combine snout or an external combine snout. In another embodiment, a plurality of snout extension tools are mounted onto internal snouts and a plurality of snout extension tools are mounted on the conventional external snouts.

One example embodiment relates to a snout extension tool for mounting onto an internal snout of a combine harvester comprising a hollow, generally cone-shaped top cover having a generally cylindrical skirt portion, wherein the cover tapers forwardly; a base plate having a substantially triangular shape with a narrower distal end and a wider proximal end, wherein the proximal end of the base plate has a triangular shaped cutout and wherein the sides of the base plate are raised to form edges around substantially the entire base plate; at least one connecting plate attachable to the base plate; and a skid plate having a substantially triangular shape, tapering to a point portion, wherein the point portion is covered by a flat triangular shaped plate filler, and wherein the skid plate has a plurality of feet attached to the bottom surface.

In another example embodiment to the snout extension tool or agricultural tool mounted onto an individual internal snout of a combine head, the tool is optionally coupled together with at least one carrier rod attached to a proximal end portion of the skid plate.

In another embodiment to the snout extension tool or agricultural tool mounted onto an individual internal snout of a combine head, the top cover and skirt portion have one or more slots of varying lengths. The top cover and skirt portion may also be comprised of thermoplastic acrylic-polyvinyl chloride and may be spray coated with an ultraviolet protective coating.

In another embodiment to the agricultural tool or snout extension tool mounted onto an individual internal snout of a combine head, the skid plate, the carrier rod, and the base plate are comprised of a metal or metal alloy or plastics or a combination thereof.

Another example embodiment relates to a snout extension tool for mounting onto an external snout of a combine harvester comprising a hollow, generally semi-cone-shaped top cover having a generally semi-cylindrical skirt portion, and wherein said cover tapers forwardly; a base plate having a substantially triangular shape with a narrower distal end and a wider proximal end wherein the proximal end of the base plate has a triangular shaped cutout and wherein the side of the plate is raised up to form edges around substantially the entire plate and wherein said base plate has a plurality of feet attached to the bottom surface; a connecting plate attachable to the base plate; and a side cover attachable to the base plate.

In another embodiment to the agricultural tool or snout extension tool mounted onto an individual external snout of a combine head, the tool is optionally coupled together with one carrier rod attached to a proximal end portion of the base plate.

In another embodiment to the agricultural tool or snout extension tool mounted onto an individual external snout of a combine head, the top cover and skirt portion have one or more slots of varying lengths. The top cover and skirt portion may also be comprised of thermoplastic acrylic-polyvinyl chloride, and further spray coated with an ultraviolet protective coating.

In another embodiment to the agricultural tool or snout extension tool mounted onto an individual external snout of a combine head, the carrier rod and the base plate are comprised of a metal or metal alloy or plastics or a combination thereof.

Another example embodiment relates to a method of assisting in the harvesting of agricultural crops comprising mounting a plurality of the internal and external agricultural tools mounted onto the snouts of a combine harvester, driving the combine harvester through a field of downed agricultural crops, and harvesting the downed crops to form a yield of a downed crop.

Another embodiment relates to increasing harvesting the yield of the downed crop, wherein the yield is comprised of 80% or greater of the downed crop.

In another embodiment, one or more agricultural tools or snout extension tools mounted onto the internal and external heads of a combine harvester may be permanently mounted to be used at the first harvest of the crop in the field and subsequently for use in harvesting any remaining crops in the field.

Another example embodiment relates to a method of extending a snout of a combine head to enhance reaping of downed crops, comprising positioning a base plate assembled together with a skid plate and a connecting plate under the snout in a position wherein the base plate and the skid plate extend forward from the snout; positioning a top cover over the snout in a position above the base plate and the skid plate, wherein the top cover also extends forward from the snout over the base plate and the skid plate; fastening the base plate, the skid plate, and the connecting plate together with the cover plate; and fastening the connecting plate to the snout in a pivotal manner such that the snout extension tool is pivotal in relation to the snout about a horizontal axis that is transverse to a forward direction of travel of the combine.

Another example embodiment relates to a method of extending a snout of a combine head to enhance reaping of downed crops, comprising positioning a base plate on a skid plate; positioning a connecting plate on the base plate and fastening the connecting plate to the base plate; positioning a top cover over the base plate, skid plate, and connecting plate; assembling and fastening the top cover, the base plate, the skid plate, and the connecting plate together as a unitary snout extension tool; mounting the unitary snout extension tool on a front portion of the snout so that the front portion of the snout is positioned between the top cover and the base plate with a front portion of the unitary snout extension tool extending forward from the front portion of the unitary snout extension tool; and connecting the connecting plate to the snout in a pivotal manner such that the snout extension tool is pivotal in relation to the snout about a horizontal axis that is transverse to a forward direction of travel of the combine.

In addition to the example aspects and embodiments described above, further aspects and embodiments will become apparent by reference to the drawings and by study of the following descriptions. The summary above is a list of example implementations, not a limiting statement.

BRIEF DESCRIPTION OF THE DRAWINGS

The accompanying drawings, which are incorporated herein and for a part of the specification, illustrate some, but not the only or exclusive, example embodiments and features. It is intended that the example embodiments and figures disclosed herein are to be considered illustrative rather than limiting in the drawings.

FIG. 4b is a detail side elevation view of a portion of the carrier rod, holes, connecting plate, base plate, and skid plate shown in FIG. 4a.

FIG. 9a is a top perspective view of an example of the skid plate with a plurality of feet.

FIG. 9b is a side elevation view of the skid plate of FIG. 9a.

FIG. 9c is a bottom plan view of the skid plate of FIG. 9a.

FIG. 10a is a top perspective view of an example skid plate without feet.

FIG. 10b is a bottom perspective view of the example skid plate in FIG. 10a.

FIG. 10c is a bottom plan view of the example skid plate in FIG. 10a.

FIG. 10d is a side elevation view of the example skid plate in FIG. 10a.

FIG. 12a is a top perspective view of an example foot. Note that the foot is shown upside down.

FIG. 12b is the top plan view of the example foot in FIG. 12a.

FIG. 12c is the side elevation view of the example foot in FIG. 12a.

FIG. 13a is a top perspective view of another example embodiment of a connecting plate.

FIG. 13b is a bottom plan view of the example connecting plate in FIG. 13a.

FIG. 13c is a side elevation view of the example connecting plate in FIG. 13a.

FIG. 13d is a front elevation view of the example connecting plate in FIG. 13a.

FIG. 14a is a top perspective view of an example left carrier rod.

FIG. 14b is a top plan view of the example left carrier rod in FIG. 14a.

FIG. 14c is a side elevation view of the example left carrier rod in FIG. 14a.

FIG. 15a is a top perspective view of an example right carrier rod.

FIG. 15b is a top plan view of the example carrier rod in FIG. 15a.

FIG. 15c is a side elevation view of the example right carrier rod in FIG. 15a.

In FIGS. 17a-17d shows various views of the example connecting plate. FIG. 17a shows a close-up of a perspective view of the example connecting plate.

FIG. 17b shows a side elevation view of the example connecting plate on segment of the example skid plate having feet.

FIG. 17c shows a side elevation view of the example connecting plate in FIG. 17a.

FIG. 17d shows the bottom plan view of the example connecting plate in FIG. 17a.

FIG. 18a shows a perspective view of an additional example embodiment of an example skid plate having a plate filler that is angled downward.

FIG. 18b shows the bottom plan view of the example skid plate of FIG. 18a.

FIG. 18c shows the side elevation view of the example skid plate of FIG. 18a.

FIG. 18d shows the bottom plan view of the example skid plate in FIG. 18a without feet.

FIG. 18e shows the side elevation view of the example skid plate in FIG. 18a without feet.

FIG. 18f shows the top plan view of an example plate filler.

FIG. 19a is a side perspective view of an example agricultural tool/snout extension tool for mounting on the right side of an external combine snout.

FIG. 19b is an exploded view of the example tool in FIG. 19a.

FIG. 20a is a top perspective view of the example base plate and side cover and feet coupled together of the example agricultural tool in FIG. 19a.

FIG. 20b is a bottom plan view of the example tool in FIG. 20a.

FIG. 20c is a side elevation view of the example tool FIG. 20a.

FIG. 21a is a top perspective view of the example skid plate to be coupled with the example agricultural tool to be mounted on the right side of an external combine snout.

FIG. 21b is a side elevation view of the example skid plate in FIG. 21a.

FIG. 21c is a bottom plan view of the example skid plate in FIG. 21a.

FIG. 22a is a top plan view of an alternative example embodiment an example agricultural tool for mounting on an external right combine snout.

FIG. 22b is an exploded view of the example too in FIG. 22a.

FIG. 23a is a perspective view of the example agricultural tool for mounting on the left side of an external combine snout.

FIG. 23b is an exploded view of the example tool of FIG. 23a.

FIG. 24a is a perspective view of the example base plate, skid plate, and side cover coupled together in FIG. 23a.

FIG. 24b is a side elevation view of the example base plate, skid plate, and side cover coupled together in FIG. 24a.

FIG. 24c is a bottom plan view of the example base plate, skid plate, and side cover coupled together in FIG. 24a.

FIG. 25a is a top perspective view of the example skid plate that is a part of the example tool in FIG. 23a.

FIG. 25b is a side perspective view of the example skid plate in FIG. 25a.

FIG. 25c is a bottom plan view of the example skid plate in FIG. 25a.

FIG. 26a is a side perspective view of another example embodiment of the top cover and skirt portion having one or more slots along the surface to be used with an internal combine snout extension tool or agricultural tool.

FIG. 26b is a right-side elevation view of the example cover in FIG. 26a.

FIG. 26c is a top plan view of the example cover in FIG. 26a.

FIG. 26d is a rear elevation view of the example cover in FIG. 26a.

FIG. 27a is a perspective view of the example right top cover and skirt portion having one or more slots along the surface to be used with a right external combine snout extension tool/agricultural tool.

FIG. 27b is a side elevation view (and upside down) of the outer side of the example top cover and skirt portion in FIG. 27a.

FIG. 27c is a side interior portion of the example top cover and skirt portion in FIG. 27a.

FIG. 27d is a rear elevation view of the example top cover and skirt portion in FIG. 27a.

FIG. 28a is a perspective view of the example left top cover and skirt portion having one or more slots along the surface to be used with a left external combine snout extension tool/agricultural tool.

FIG. 28b is a side elevation view of the outer side of the example left top cover and skirt portion in FIG. 28a.

FIG. 28c is a side interior portion of the example left top cover and skirt portion in FIG. 28a.

FIG. 28d is a rear elevation view of the example left top cover and skirt portion in FIG. 28a.

FIG. 29a is a perspective view of another example embodiment of a full base plate that can be used with or without a skid plate.

FIG. 29b is a bottom plan view of the example base plate in FIG. 29a.

FIG. 29c is a side elevation view of example base plate in FIG. 29a.

DETAILED DESCRIPTION

Figure 1:
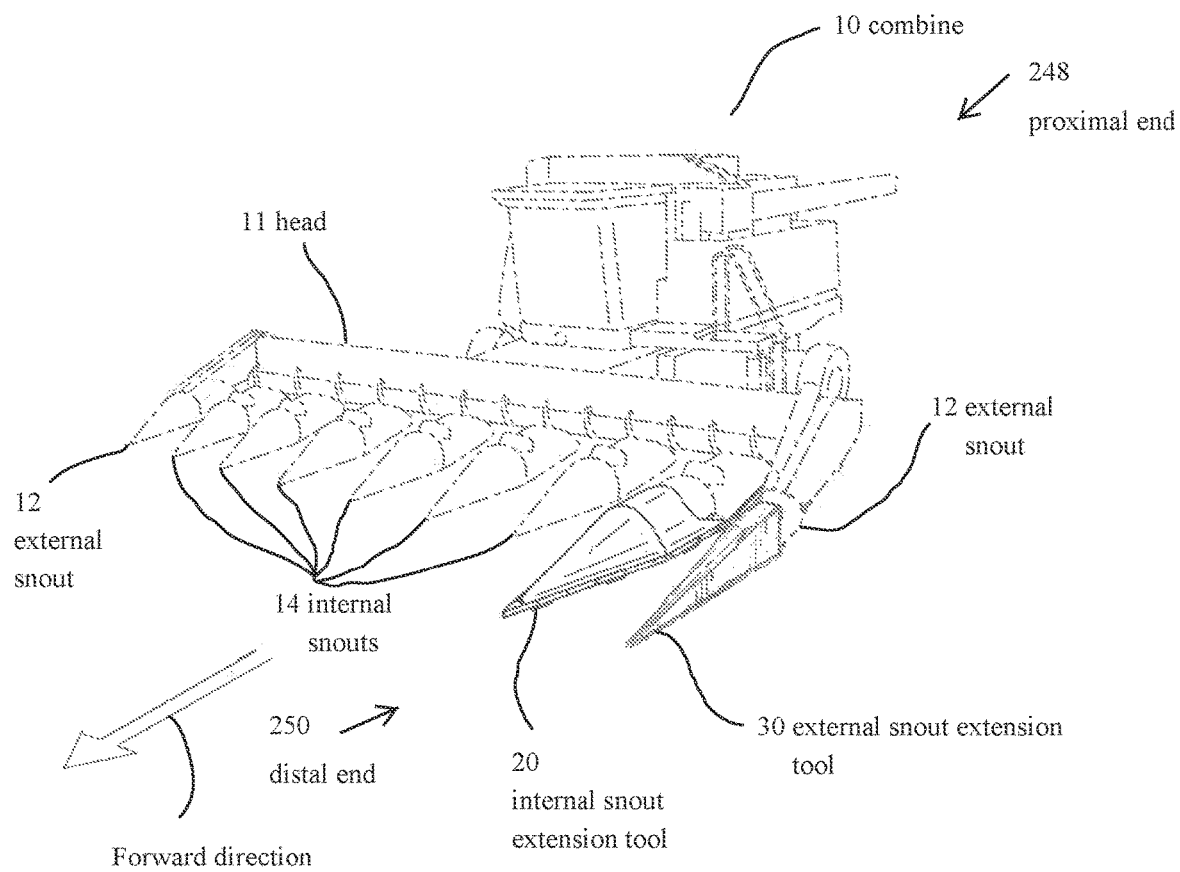
FIG. 1 is a perspective view of an example combine equipped with a head and showing an example snout extension mounted on one of the internal snouts and one snout extension mounted on one of the external snouts of the example head.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims. Note that the direction terms "left" when used to describe components, features, or relative position in the drawing figures, are directional references in accordance with the perspective of person driving the combine forwardly.

One example embodiment relates to a snout extension tool 20 comprised of a base component with a substantially flat bottom surface, i.e., 27 and a length extending between a proximal end and a distal end with opposite lateral edges that converge toward each other at the distal end of the base component; a cover component 23 and 22 that arches over the base component 27 and/or 28 and that has opposite lateral edges which extend from a proximal end of the cover component where the lateral edges of the cover component are at least as wide as the snout of the combine header and converge toward each other at a distal end of the cover component 22 and 23 in a profile that conforms to the lateral edges of the base component 27 and/or 28, and wherein the lateral edges of the cover component 22 and 23 are connected with the lateral edges of the base component 27 and/or 28 so that the cover component 22 and 23 and the base component have a space between them that is open adjacent to the proximal ends of the base component and the cover component and that converges toward the distal ends of the base component and the cover component, and, further, wherein the proximal end of the cover component 23 arches over the base component a sufficient amount to provide the open proximal end of the space of a size that conforms substantially to the snout of the combine header 14; and connecting plates 26 on opposite sides of the snout extension tool 20 adjacent the proximal ends of the base component 27 and/or 28 and the cover component with attachment means on the connecting plates 26 on the opposite sides of the snout extension tool 20 that are adapted to connect the snout extension tool 20 to the snout of a combine 14 in a pivotal manner that is pivotal about a horizontal axis. Examples of the above embodiment can be found in FIGS. 1-18 and 26, which illustrate in detail, the attachment means via holes, mounting bolts, and connecting plates, although myriad other pivotal attachment means can also be used, e.g., hinges, ball and socket joints, flexible straps, and others that are not shown, but will be understood by person skilled in the art once they understand from this description how the snout extension tool 20 is structured and intended to function.

Another example embodiment relates to a snout extension tool 30 comprised of a base component with a substantially flat bottom surface, i.e., 37 and a length extending between a proximal end and a distal end with opposite lateral edges that converge toward each other at the distal end of the base component; a cover component 32 and 33 that arches over the base component 37 and/or 38 and that has opposite lateral edges which extend from a proximal end of the cover component where the lateral edges of the cover component are at least as wide as the snout of the combine header and converge toward each other at a distal end of the cover component 32 and 33 in a profile that conforms to the lateral edges of the base component 37 and/or 38, and wherein the lateral edges of the cover component 32 and 33 are connected with the lateral edges of the base component 37 and/or 38 so that the cover component 32 and 33 and the base component have a space between them that is open adjacent to the proximal ends of the base component and the cover component and that converges toward the distal ends of the base component and the cover component, and, further, wherein the proximal end of the cover component 33 arches over the base component a sufficient amount to provide the open proximal end of the space of a size that conforms substantially to the snout of the combine header 12; and a connecting plate 36 adjacent the proximal end of the base component 37 and/or 38 and the cover component with attachment means on the connecting plate 36 on the opposite sides of the snout extension tool 20 that are adapted to connect the snout extension tool 30 to the snout of a combine 12 in a pivotal manner that is pivotal about a horizontal axis. Examples of the above embodiment can be found in FIGS. 1, 19-25 and 27-28, which illustrate in detail, the attachment means via holes, mounting bolts, and connecting plates, although myriad other pivotal attachment means can also be used, e.g., hinges, ball and socket joints, flexible straps, and others that are not shown, but will be understood by person skilled in the art once they understand from this description how the snout extension tool 20 is structured and intended to function.

An example snout extension tool 20 is illustrated in FIG. 1 mounted on a conventional snout of a head 11 of a combine 10 for improving the reaping effectiveness of the combine 10, for "downed" crops such as corn, but which can also be used on snouts for other kinds of grain heads that utilize such snouts for guiding stalks into the heads. "Downed crops" are crops in which there are significant numbers or areas of broken or bent stalks so that the seed heads, cobs, or pods are near or on the ground, thus difficult to reap. Such broken or bent stalks can result from various causes, e.g., heavy seed heads, cobs, or pods that may ordinarily indicate very healthy crops, but which then get bent or broken in a heavy rain or wind. Broken or bent stalks can also result from damage due to hail, pests, or diseases. If a combine does not reap any portion of such downed crops, such grains are lost and crop yields, and thus profitability, suffers. The conventional snouts 12, 14 of conventional heads 11 (for example, the conventional corn head 11 illustrated on the example combine 10) are effective for guiding standing, upright, stalks into the gathering chains, snap rollers, or cutters of the heads 11, but lodged or otherwise broken or bent stalks often are not picked up or straightened enough by conventional snouts 12, 14 to be caught or cut by the gathering chains, snap rollers, or cutters to be reaped effectively and moved onto the platform of the head 11. Reducing combine speed or lowering the combine head 11 as much as possible may mitigate such losses, but such mitigating techniques have practical limits and are often only minimally effective, if at all, in stemming losses from downed crops.

In FIG. 1, a plurality of conventional internal snouts 14 are illustrated in addition to two external conventional snouts 12 on each lateral end of the head 11. The width of the external snouts 12 are typically roughly half the width of the internal snouts 14, although other sizes may also be used. In FIG. 1, the example conventional combine 10, including the example conventional head 11 and example conventional snouts 12, 14 are shown in phantom lines. An example internal snout extension tool 20 is shown in FIG. 1 mounted on one of the example conventional internal snouts 14, and an example external extension snout tool 30 is shown in FIG. 1 mounted on one of the example conventional external snouts 12. In one embodiment, at least one snout extension tool, either 20 or 30, is mounted onto the appropriate conventional snout 14 or 12. In another embodiment, a plurality of snout extension tools are mounted on the internal snouts 20 and a plurality of snout extension tools 30 are mounted on the conventional external snouts 12. The snout extension tools 20, 30 provide additional effective snout length to the conventional snouts 12, 14, and such additional length is more effective in catching and raising downed stalks enough and in time for such stalks to be caught and gathered by the gathering chains (not shown) of the conventional head 11 to be reaped by the conventional head 11. The more snout extension tools 20, 30 that are mounted on respective conventional snouts 12, 14, the higher the overall yield of the crop. While not shown in FIG. 1, in ordinary practice, it may be expected that one internal snout extension tool 20 would be mounted on each internal conventional snout 14, and one external snout extension tool 30 would be mounted on each external conventional snout 12, so that each of the internal snouts 14 of the head 11 has an internal snout extension tool 20 and each of the external snouts 12 has an external snout extension tool. The example internal snout extension tool 20 shown in FIG. 1 is representative of the other internal snout extensions tools that may be mounted on the other internal snouts 14. Also, the example external snout extension tool 30 shown in FIG. 1 is representative of the other external snout extension tool to be mounted on the other external snout 12, although the other external extension tool (not shown) may be a mirror image of the external extension tool 30 shown in FIG. 1.

Figure 2:
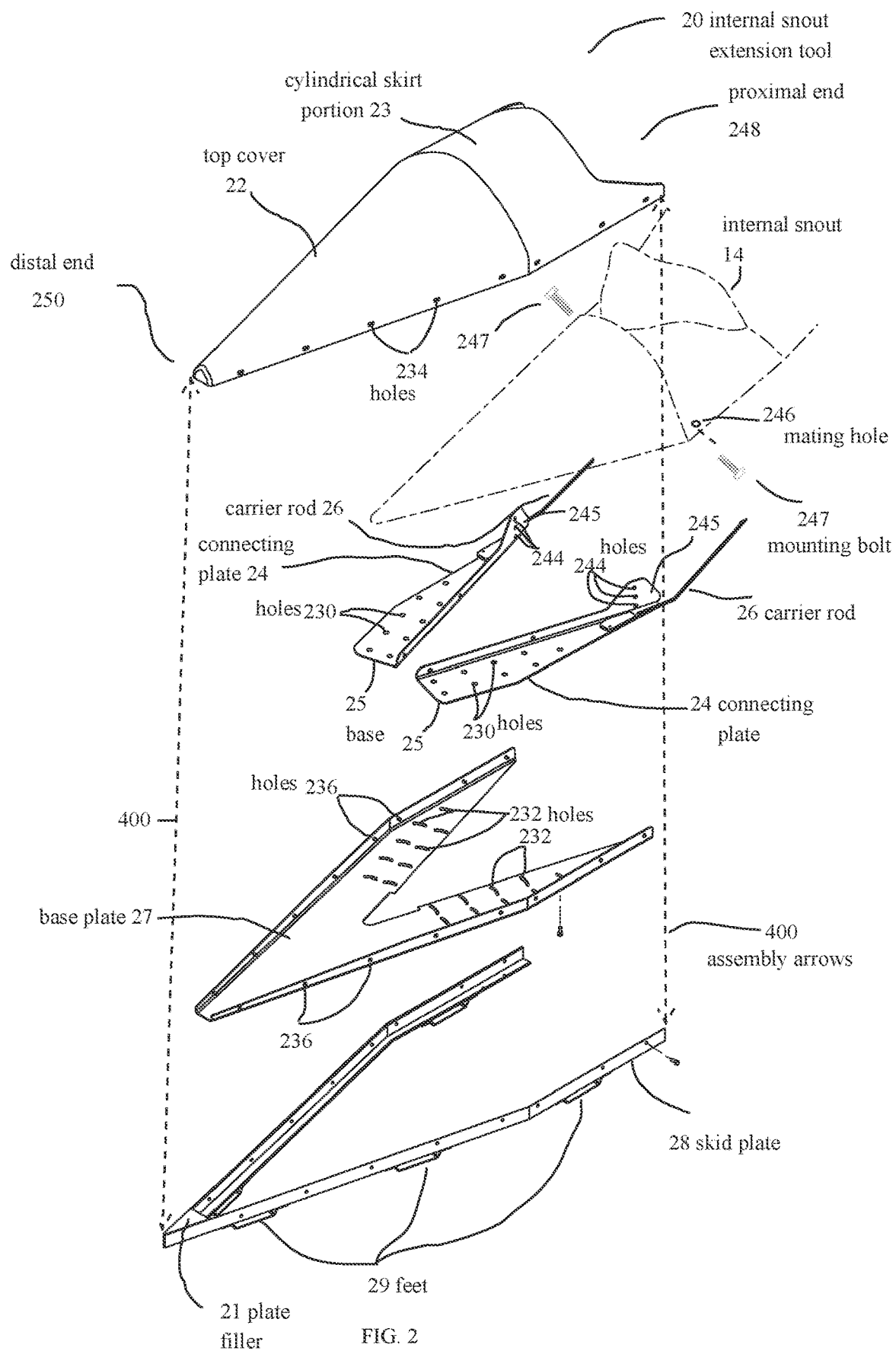
FIG. 2 is an exploded perspective view of an example agricultural tool/snout extension for mounting on an internal combine snout.

In referring to FIG. 2, an exploded perspective view of the internal snout extension tool 20 is shown in spatial relation to an example conventional internal snout 14 (shown in phantom lines) on which the internal snout extension tool 20 is to be mounted. From top to bottom is the top cover 22, with a semi-cylindrical skirt portion 23; the conventional internal snout 14 (shown in phantom lines); two opposing connecting plates 24; two opposing carrier rods 26; a base plate 27; and a skid plate 28 having a plate filler 21 and optionally, one or more feet 29. As indicated by the assembly arrows 400 in FIG. 2, the top cover 22, the connecting plates 24, the base plate 27 with the carrier rods 26, and the skid plate 27 are all assembled together to form the internal snout extension tool 20, and the snout extension tool 20 is then mountable on the conventional internal snout 14 of the combine head 11 as shown in FIG. 1. It is to be noted that the internal snout extension tool 20 and other example embodiments of the tool 20 can either be assembled first and then mounted on the snout 14 of the combine head 11, or the snout extension tool 20 components as shown in example FIG. 2 where the base plate may be assembled together with a skid plate and a connecting plate under the snout in a position wherein the base plate and the skid plate extend forward from the snout, positioning a top cover over the snout in a position above the base plate and the skid plate, wherein the top cover also extends forward from the snout over the base plate and the skid plate, fastening the base plate, the skid plate, and the connecting plate together with the cover plate; and fastening the connecting plate to the snout in a pivotal manner such that the snout extension tool is pivotal in relation to the snout about a horizontal axis that is transverse to a forward direction of travel of the combine.

In one embodiment, the top cover 22 and skirted portion 23 are made out of thermoplastic acrylic-polyvinyl chloride or an acrylic-polyvinyl chloride alloy. Other plastics are also contemplated, including but not limited to, polyvinyl chlorides, ABS (Acrylonitrile-Butadiene-Styrene), HDPE (High-Density Polyethylene), HMWPE (High Molecular Weight Polyethylene), Polycarbonate, Styrene, and UHMW (Ultra High Molecular Weight Polyethylene). In other embodiments, any or all of the top cover 22, skirted portion 23, connecting plates 24, carrier rods 26, or skid plate 28 may be made of metal or metal alloy and or the plastics.

The example top cover 22 is generally tapered or cone shaped extending from a proximal end 248 at the skirted portion 23 to a distal end 250. The cone shaped portion of the top cover 22 tapers forwardly to the distal end 250, and the top cover 22 is hollow so as to conform to the rounded or semi-cylindrical shape of the conventional internal snout 14.

As best seen in FIGS. 2 and 3, each of the two connecting plates 24 has a plurality (e.g., nine) of holes 230 in the base 25 of the plate 24. The base plate 27 has a plurality of corresponding holes 232 in alignment with the holes 230 in the connecting plates 24, so that the connecting plates 24 are attachable to the base plate 27 using, for example, but not limited to, hex head bolts, washers, nuts and lock washers through the aligning holes 230, 232. As also best seen in FIGS. 2 and 3, there are a plurality of holes 234 along the marginal bottom edge portion of the top cover 22, which correspond to and align with a plurality of holes 236 in lateral edge portions of the base plate 27. The lateral edge portions of the skid plate 28 also have a plurality of holes 238, which align with the holes 234 in the top cover 22 and with the holes 236 in the base plate 27. Accordingly, when the skid plate 28, the base plate 27 with the connecting plates 24, and the top cover 22 are assembled together as indicated by the assembly arrows 400, those components are fastened together with a plurality of bolts 247 through those holes 234, 236, 238 in the respective components 22, 27, 28 as best seen in FIGS. 3 and 4a. Of course, persons skilled in the art will understand that other fasteners, spot welds, clips, detents, or any of myriad other known fastening or joining techniques can be used instead of the example bolts 247 through the corresponding holes in the respective components.

When the internal snout extension tool 20 is assembled, for example as described above, it can be mounted on any of the conventional internal snouts 14 as shown in FIG. 1 as explained below. Referring now primarily to FIGS. 2 and 6, the connecting plates 24 each have at least one hole 244 on the raised portion close to the proximal end 245 of the connecting plate 24. For adjustability, a plurality (e.g., three) such holes 244 are provided. To mount the internal snout extension tool 20 on a conventional internal snout 14, a mating hole 246 can be provided, e.g., drilled, into each lateral side of the conventional internal snout 14 in a location as shown, for example, in FIG. 2, where such mating holes 246 align with the holes 244 in the connecting plates 24 when the internal snout extension tool 20 is placed onto the conventional snout 14 as shown in FIG. 1. Mounting bolts 247 (see FIGS. 2, 5, 6, and 8) can then be inserted through the a hole 244 in the connecting plate 24 and through the holes 246 in the conventional internal snout 14 to mount the internal snout extension tool 20 in a pivotal manner onto the conventional internal snout 14 so that the internal snout extension tool 20 is pivotal about a horizontal axis 249 defined by and extending through the mounting bolts 247 (see FIGS. 5 and 8) so that the horizontal axis 249 is transverse to the forward direction of travel of the combine 10 as indicated in FIG. 1. Any of the holes 244 in the connecting plate 24 can be selected for this mounting, depending on how far a user wants the proximal end 248 of the internal snout extension tool 20 to hang below the conventional internal snout 14. With the internal snout extension tool 20 mounted on the conventional internal snout 14 in this manner, the top cover 22 of the internal snout extension tool 20 rests on the surface of the conventional internal snout 14. An appropriate adjustment of the proximal end 248 of the internal snout extension tool 20 in relation to the conventional internal snout 14 using an appropriate setting with the holes 244 as explained above can, for example, set the skid plate 28 of the internal snout extension tool 20 to be parallel to the ground regardless of any particular height or angle that the conventional internal snout 14 may have in relation to the ground.

In use, as the combine 10 moves on the ground in the forward direction (see FIG. 1) to move the head 11 through a grain crop, for example corn (not shown), the internal snout extension tool 20 glides along the ground on or just above the ground and picks up downed stalks of the grain a sliding action of the top cover surface on the stalks as the distal end 250 of the skid plate 27 and the sloped, conical portion of the top cover 24 slip under the broken or bent stalks and guide such broken or bent stalks over and alongside the surface of the top cover 22 to the proximal end 248 of the internal snout extension tool 20. By the time the stalks reach the proximal end 248 of the internal snout extension tool 20, they are straightened and stand upright enough for the conventional internal snout 14 to continue guiding them into the gathering chains, snap rollers, or cutters (not shown) of the combine head 11 where the reaping operation of the combine 10 is completed. When the internal snout extension tool 20 encounters uneven, rising ground as the combine 10 moves over the ground, the pivotal connection of the internal snout extension tool 20 to the conventional internal snout 14 as described above allows the internal snout extension tool 20 to glide up and over such uneven, rising ground. Optional feet or wear pads 29 can be provided on the bottom of the skid plate 28.

For additional straightening and guidance, e.g., for shorter or weaker stalks that are downed, optional carrier rods 26 (see FIGS. 2-7) are provided on the internal snout extension tool 20. As shown, for example, in FIGS. 2-7, the two carrier rods 26 are mounted on the connecting plates 24 and extend rearward and upwardly from opposite lateral sides of the proximal end 248 of the internal snout extension tool 20 for some distance along the respectively opposite sides of the conventional internal snout 14. These carrier rods 26 uphold and support shorter and weaker stalks that might not be supported by the larger surfaces of the conventional internal snout 14, effectively supporting and carrying them far enough alongside the conventional internal snout 14 to reach and be captured by the gathering chains, snap rollers, or cutters (not shown) of the combine head 11.

Referring again to FIGS. 1-7, some additional details can be provided as examples, but not for limitation. In one embodiment, the snout extension tool 20 for mounting onto an individual internal snout extension tool 20 has a base plate 27 which has a substantially triangular shape to accommodate the substantially triangular shape of an individual conventional internal snout 14 of a combine head 11. The point (distal end) of the individual conventional snout 14 extends approximately halfway up the base plate 27. The proximal end of the base plate 27 has a triangular shaped cutout and the sides of the base plate 27 are raised up to form edges around substantially the entire base plate 27. The base plate 27 has a total of nine holes on the flat surface, five holes along the outer edge and four holes along the inner edge. Less or more than nine holes can be provided and are contemplated. These holes may be circular in shape or slotted in shape. FIG. 2 shows the holes as slotted in shape, which allows for more adjustability of the example snout extension tool 20 to be adapted to fit a variety of different conventional snouts 14, for example, as made by different combine manufacturers or as may be used on different combine heads 11. These holes are used for attaching a base plate 27 to one or more connecting plates 24 using for example but not limited to, hex head threads, washers, nuts and washer locks. Other components for attachment are also contemplated. On the raised edges, sixteen holes are shown, eight on each side of the base plate These holes are used for attaching directly to the skid plate 28. Less or more than sixteen holes can be provided and are contemplated. These holes are used for attaching the base plate 27 directly to the skid plate 28 using for example but not limited to, hex head threads, washers, nuts and washer locks.

In another embodiment, when the entire snout extension tool 20 is mounted onto an individual conventional snout 14, the snout extension tool 20 extends a minimum of 35 inches to 45 inches from the point of the individual conventional snout 14. This extension and the angle and length of the top cover 22 decrease the space between adjacent individual snouts 14, creating a "dam" and allowing the crops to run up to the combine rather than break or be left on the ground.

In another embodiment, the snout extension tool 20 for mounting onto the individual internal snout 14 of a combine 10 has a skid plate 28 having a triangular shaped plate filler on the distal end and a plurality of feet 29 on the bottom. The drawings show for example six generally rectangular shaped feet or wear pads, three on each side of the skid plate, but more or fewer feet can be provided or none at all. Other shapes, such as square, can also be provided.

One example purpose of the feet or wear pads 29 is to keep the skid plate 28 and the rest of the snout extension tool 20 off the ground and help prevent or minimize dirt from being pushed by the snout extension tool 20 which could cause undue stress and wear on the individual conventional snouts 14 and other components or parts of the combine 10. Additionally, a large amount of dirt being pushed by the snout extension tool 20 could cause damage to the snout extension tool 20 by creating too much side draft, thus lateral stress or strain. The feet or wear pads 29 may be made as separate pieces and are mounted onto the skid plate 28, for example, by welding or other conventional joining technique.

On both sides of the skid plate 28 of one example embodiment, sixteen holes are shown, eight on each side of the skid plate 28. These holes are used for attaching the skid plate 28 directly to the base plate 27 and the top cover 22 and cylindrical skirt portion 23. Less or more than sixteen holes are contemplated.

Figures 3A, 3B, 3C:
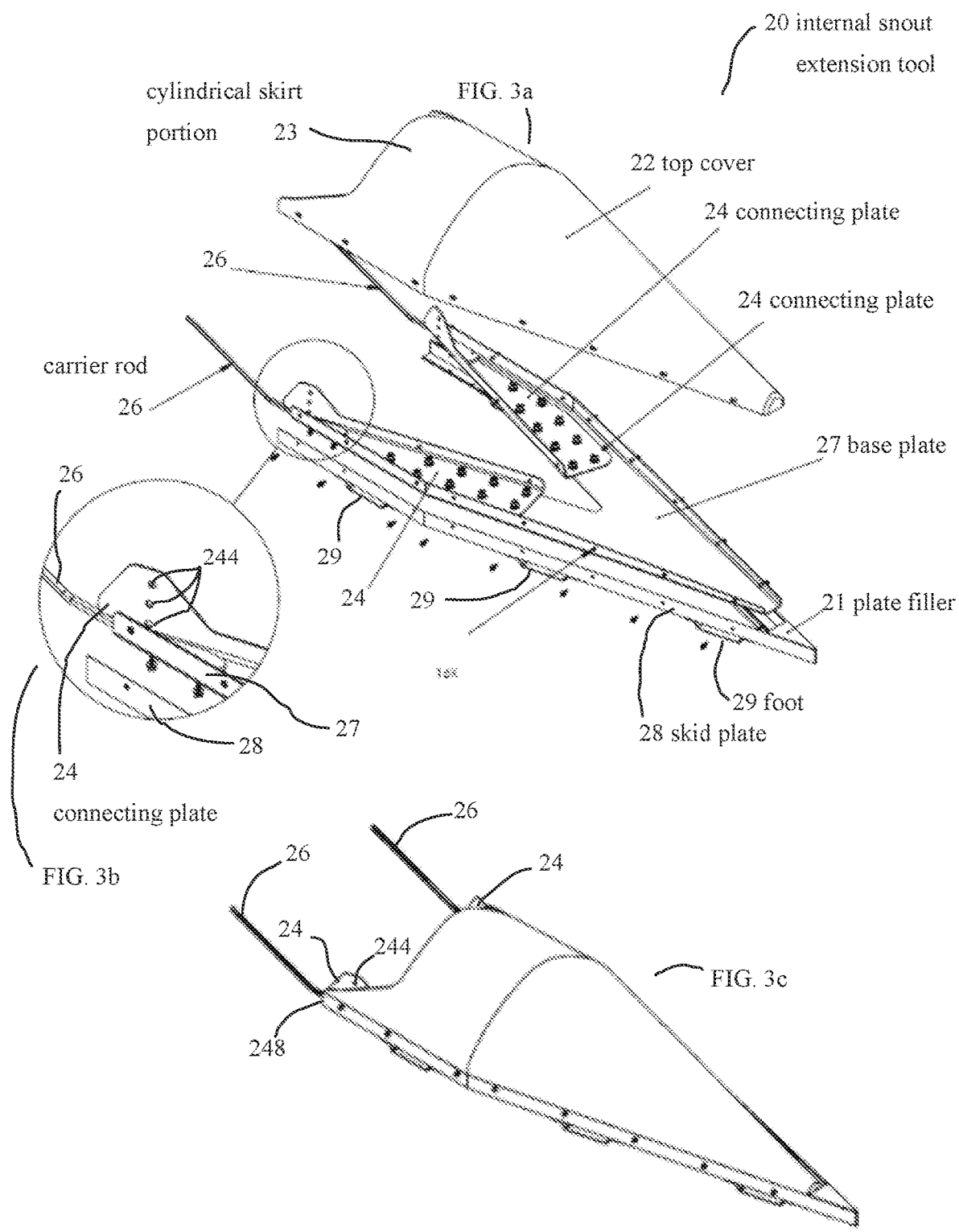
FIG. 3a is a semi-exploded perspective view of an example agricultural tool/snout extension for mounting on an internal combine snout.
FIG. 3b is a detail from FIG. 3a showing the raised portion of the connecting plate and how the connecting plate, holes, carrier rod, base plate, and skid plate are coupled.
FIG. 3c is a perspective view of the example tool of FIG. 3a with all of the parts coupled together.
Figure 4A:
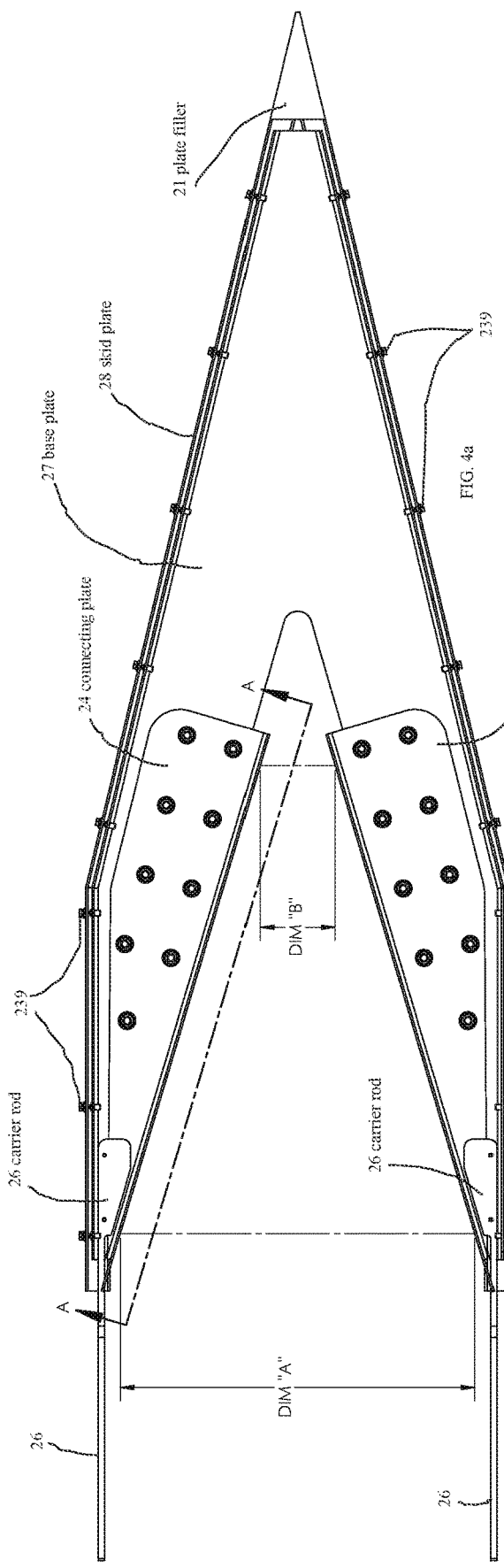
FIG. 4a is a top plan view of the connecting plates coupled together with the carrier rods, bolts, base plate and skid plate.

In referring to FIGS. 3a-3b, FIG. 3a shows a semi-exploded perspective view of one example embodiment of the snout extension tool of FIG. 2. FIG. 3b shows a detail of a portion of the attachment of the skid plate 28, base plate 27, carrier rods 26, and connecting plate 24, and FIG. 3c shows a perspective view of FIG. 3a assembled. Note that the holes (not shown) in connecting plate 24 are illustrated with bolts 247 within.

In referring to FIG. 4a, a top plan view of one example embodiment is shown of the connecting plates 24 coupled together with the carrier rods 26, base plate 27, and skid plate 28 with the plate filler 21.

Figure 4B:

In referring to FIG. 4b, a detail side elevation view of a portion of the carrier rod 26, connecting plate 24, and base plate 27 of one example embodiment is shown.

Figure 5:
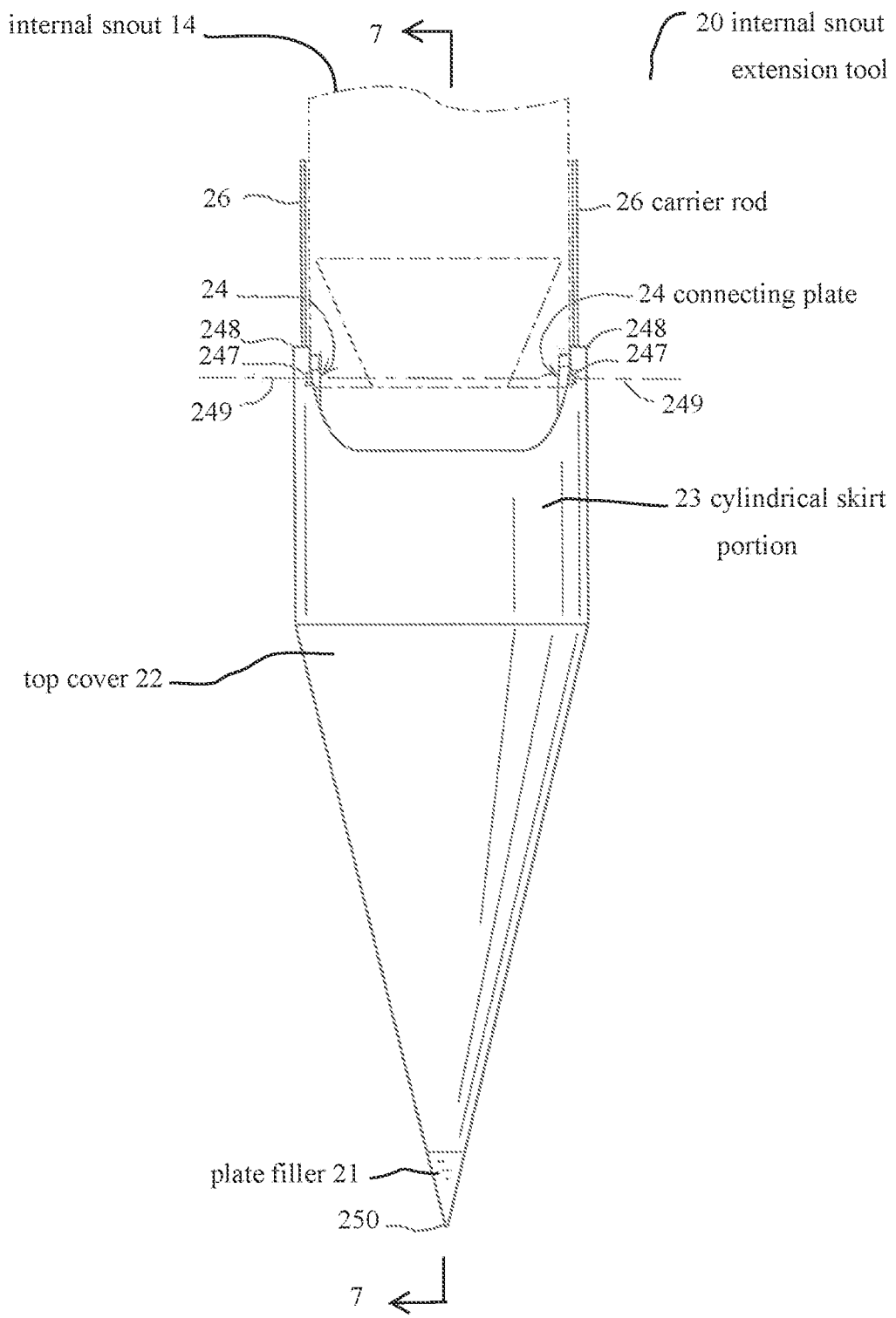
FIG. 5 is a top plan view of the example tool shown in FIG. 3c positioned on an example individual internal snout, which is shown in phantom lines.
Figure 6:
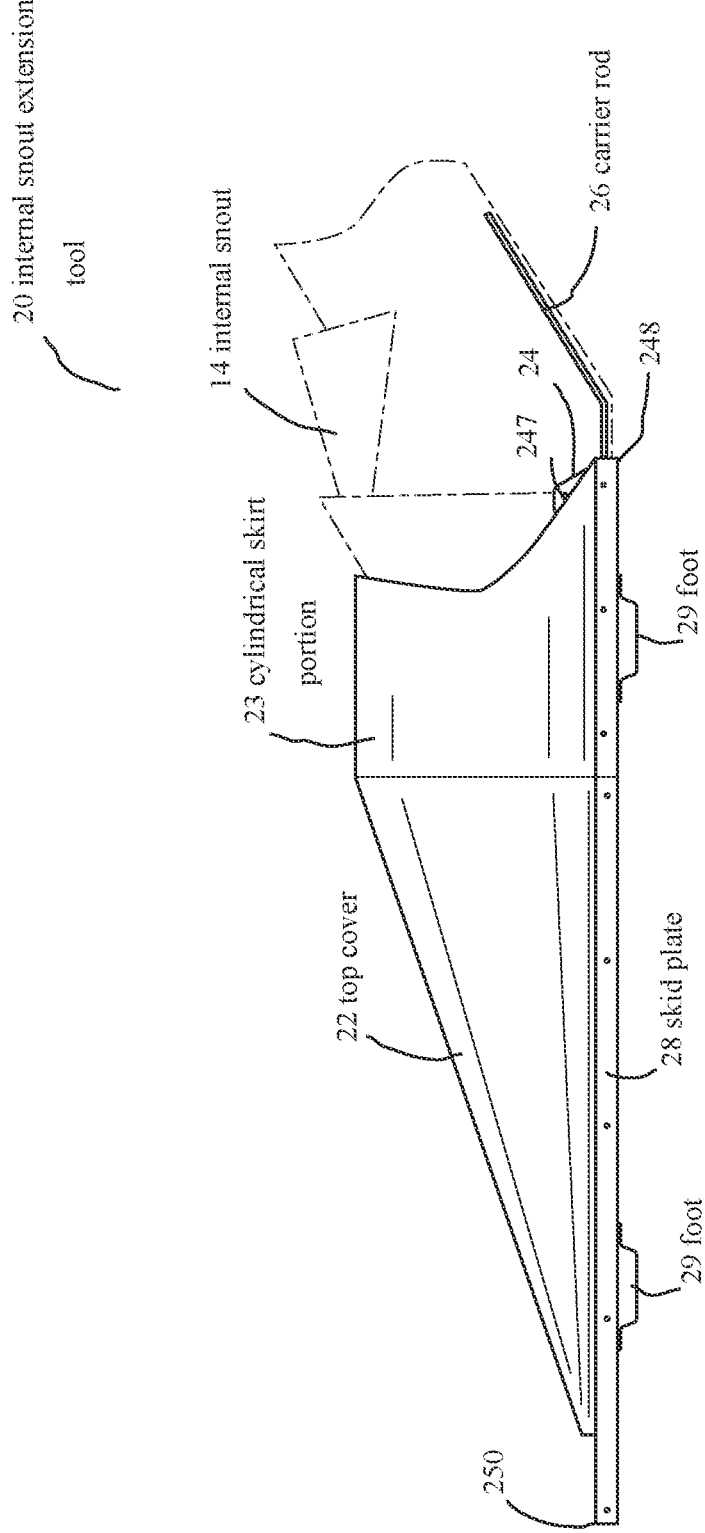
FIG. 6 is a side perspective view of the example agricultural tool shown in FIG. 5.

In referring to FIG. 5, the top plan view of FIG. 3c of one example embodiment is shown mounted onto an individual internal conventional snout 14. FIG. 5 shows the top cover 22, the cylindrical skirt portion 23, the plate filler 21, and the internal conventional snout 14 (in phantom lines).

In referring to FIG. 6, a side elevation view of FIG. 5 is shown for one example embodiment of the snout extension tool mounted onto an internal snout of a combine 10. FIG. 6 shows the top cover 22, cylindrical skirt portion 23, a plurality of feet or wear pads 29, the skid plate 28, and the internal snout 14 (in phantom lines).

Figure 7:
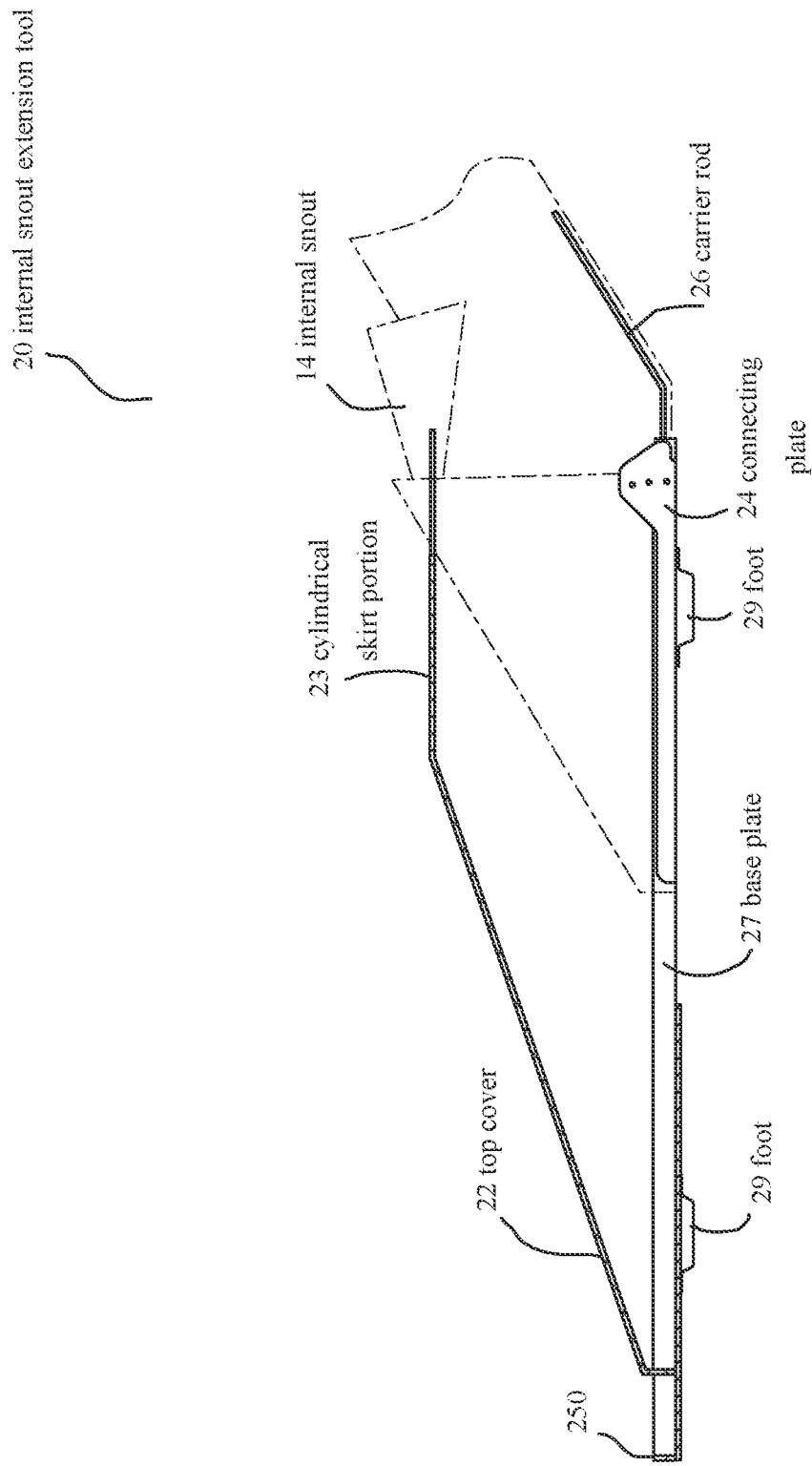
FIG. 7 is a longitudinal cross-section view of the example agricultural tool taken along the cutting plane line 7-7 in FIG. 5.
Figure 8:
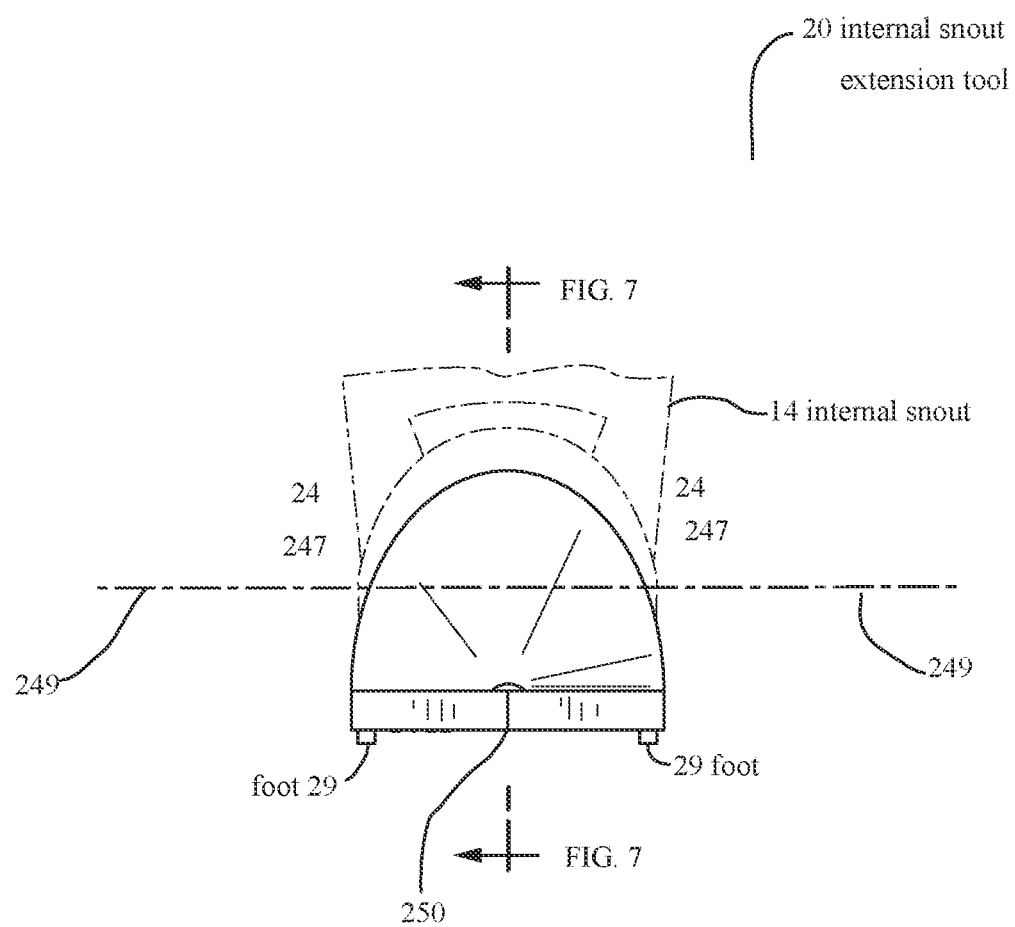
FIG. 8 is a rear elevation view of the example agricultural tool shown in FIGS. 5 and 7.

In referring to FIG. 7, a longitudinal cross-section view taken along section line 7-7 in FIG. 8 is shown, the snout extension tool 20 mounted on an internal snout 14 of a combine 10. FIG. 7 shows the top cover 22, the cylindrical skirt portion 23, a plurality of feet 29, the base plate 27, the connecting plate 24, the carrier rod 26, and the internal snout 14.

In referring to FIG. 8, a rear elevation view of FIG. 5 is shown mounted onto an individual internal combine head of a harvester 14. FIG. 8 shows a plurality of feet 29, the top cover 22, the cylindrical skirt portion 23, and the internal head of a combine harvester 14.

In referring to FIGS. 9a-9c, various views of one example embodiment of the skid plate 28 to be used with an internal extension snout tool 20 are shown.

FIG. 9a is a top perspective view of the skid plate 28 with a plurality of feet 29.

FIG. 9b is a side elevation view of the skid plate 28 and feet 29 of FIG. 9a.

FIG. 9c is a bottom plan view of the skid plate 28 and feet 29 of FIG. 9a.

In another example embodiment, a skid plate 28 without feet 29 is contemplated. In referring to FIGS. 10a-10d, various views of a skid plate 28 to be used with an internal extension snout tool 20 are shown, but without the previously disclosed feet 29.

Figures 10A, 10B, 10C, 10D:
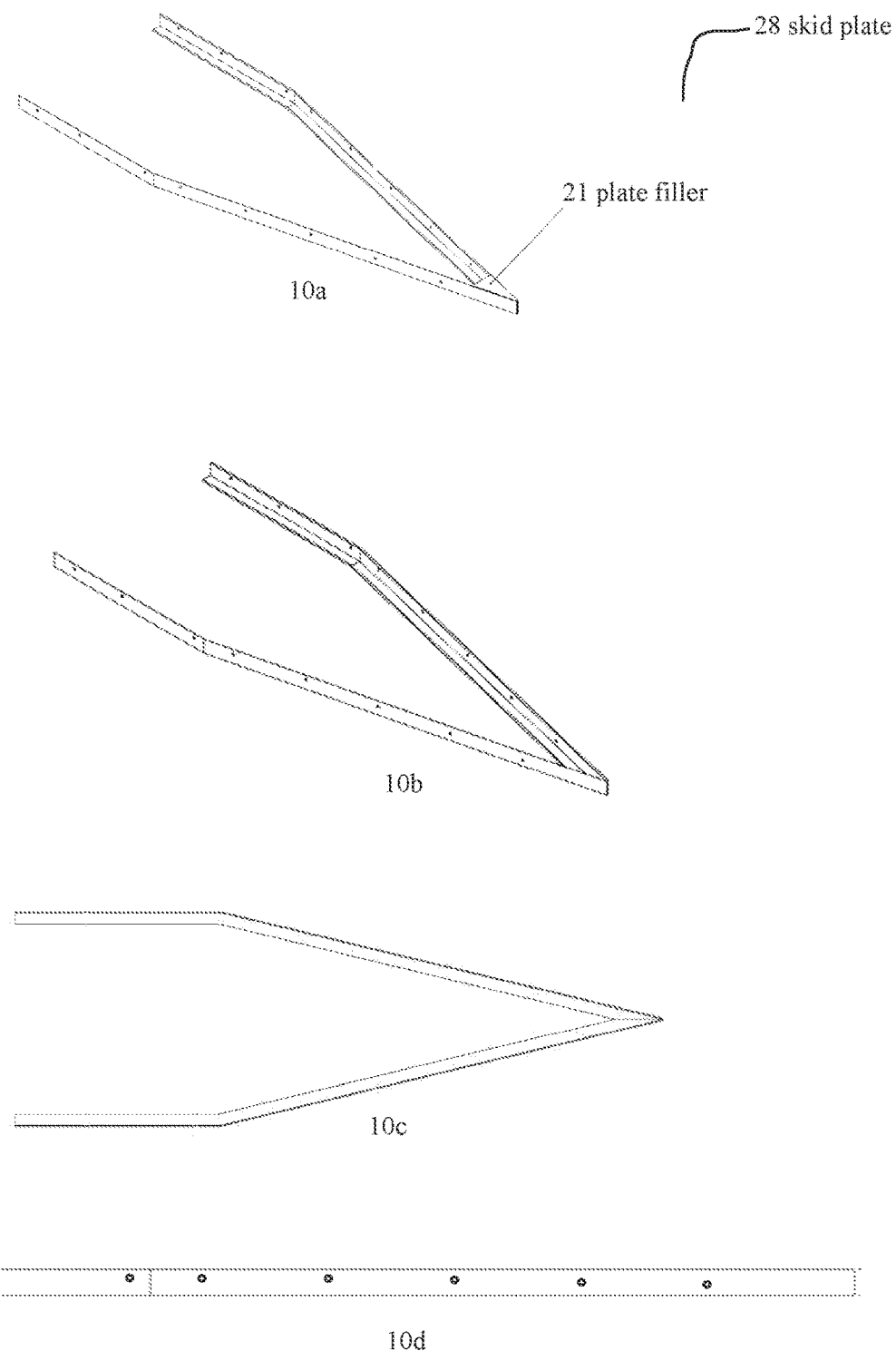

FIG. 10a is a top perspective view of the skid plate 28 without feet and the plate filler 21.

FIG. 10b is a bottom plan view of the skid plate 28 of FIG. 10a.

FIG. 10c is a bottom plan view of the skid plate 28 of FIG. 10a.

FIG. 10d is a side elevation view of the skid plate 28 of FIG. 10a.

Figure 11:
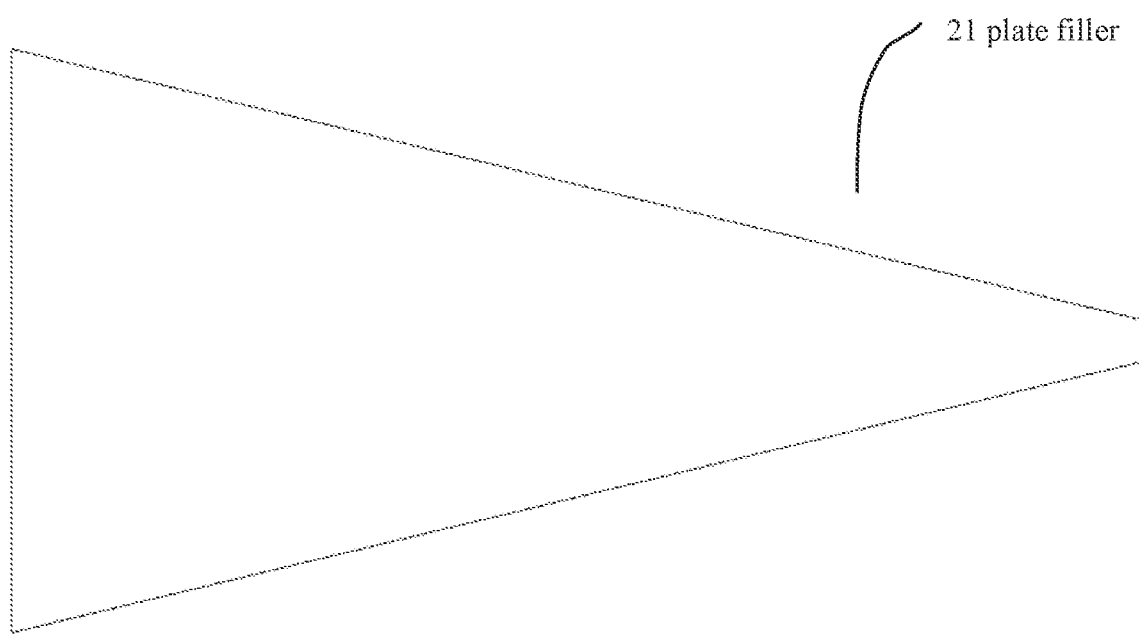
FIG. 11 is a top plan view of the plate filler.

In referring to FIG. 11, a top plan view of one example embodiment of a plate filler 21 is shown. Note that the bottom plan view of the individual plate filler 21 is the exact same view.

In referring to FIGS. 12a-12c, various views of one example embodiment of an individual foot 29 are shown.

FIG. 12a shows a top perspective view of a foot 29.

FIG. 12b shows a top plan view of the foot 29 of FIG. 12a.

FIG. 12c shows a side elevation view of FIG. 12a.

In referring to FIGS. 13a-13d, various views of another example embodiment of a connecting plate 24b are shown.

FIG. 13a is a top perspective of the connecting plate 24b. Also shown are the holes 244 along the raised portion (3 holes per each raised portion) and the 9 holes 230 on the base 25.

FIG. 13b is a bottom plan view of FIG. 13a.

FIG. 13c is a side elevation view of FIG. 13a.

FIG. 13d is a front (or rear) elevation view of FIG. 13a.

Figures 13E, 13F:
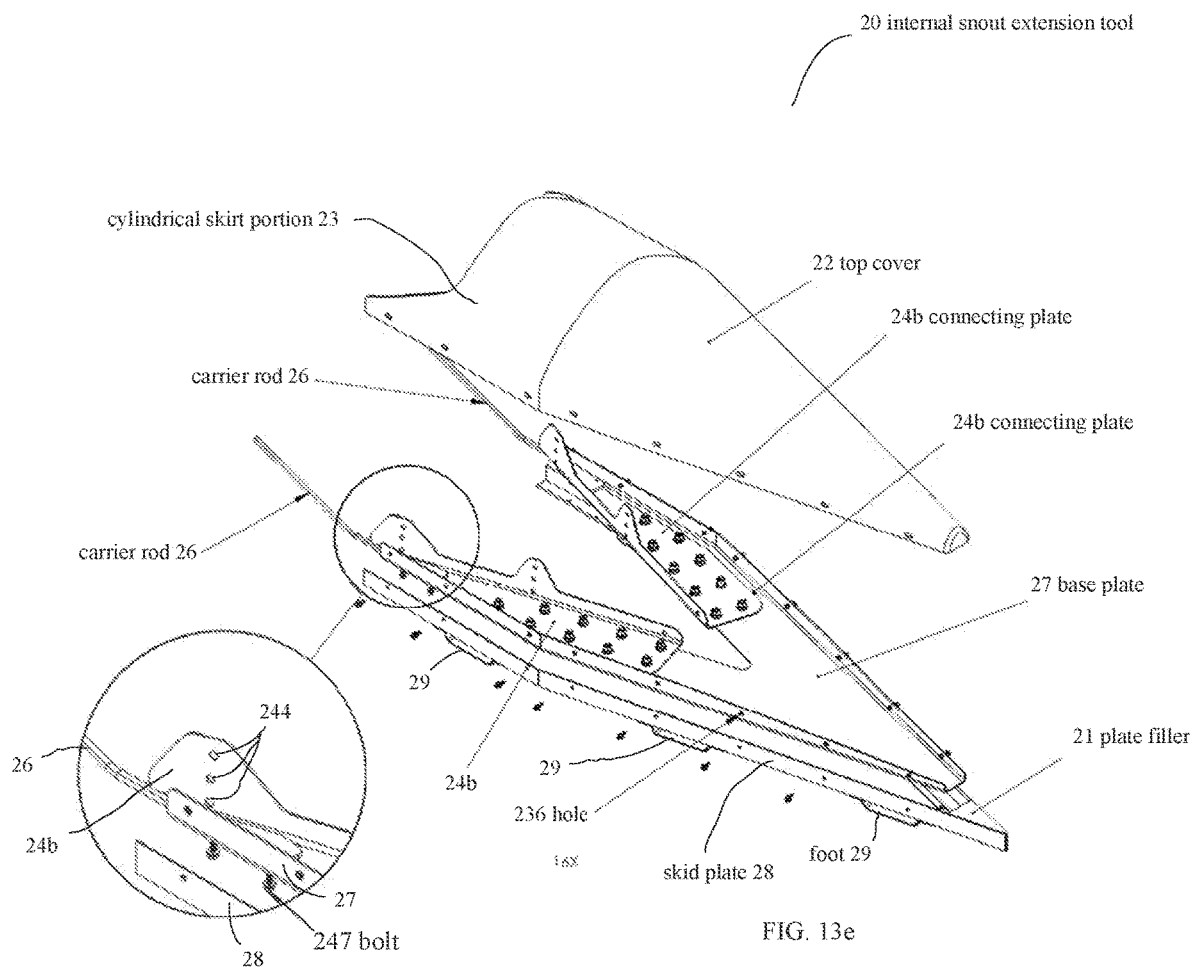
FIG. 13e is a top perspective view of the example connecting plate of FIGS. 13a-13d as coupled with an internal snout extension tool.
FIG. 13f is a detail from FIG. 13e showing how the connecting plate, holes, carrier rod, base plate, and skid plate are attached.

In referring to FIGS. 13e-13f, an internal snout extension tool or agricultural tool 20 is shown with an example embodiment of the connecting plate 24b from FIGS. 13a-13d.

FIG. 13e is an exploded view an internal snout extension tool or agricultural tool 20 is shown with an example embodiment of the connecting plate 24b from FIG. 13a, wherein the connecting plate has two raised portions having holes 244, wherein one or both raised portions can be utilized and coupled to an internal snout 14 or external snout as previously discussed.

In referring to FIGS. 14a-14c, one example embodiment of the left carrier rod 26 is shown.

FIG. 14a is a top perspective view of the carrier rod 26.

FIG. 14b shows a top plan view of the carrier rod 26 of FIG. 14a.

FIG. 14c shows the side elevation view of the carrier rod 26 of FIG. 14a and the angle of the carrier rod 26. The angle is shown as 160 degrees, however any other angles are contemplated and can be changed to accommodate all styles and types of snout, 14 or 12, of a combine head 11. The angle of deflection helps to allow the crops to be smoothly carried onto combine heads 11 without encountering any abrupt changes in direction.

In referring to FIGS. 15a-15c, one example embodiment of a right carrier rod 26 is shown.

FIG. 15a is a top perspective view of the carrier rod 26.

FIG. 15b shows a top plan view of the carrier rod 26 of FIG. 15a.

FIG. 15c shows the side perspective view of the carrier rod 26 of FIG. 15a and the angle of the distal portion of the carrier rod 26 with respect to the plane of the connecting plate 24 and the base plate 27 (i.e., the angle of deflection), which helps the stalks of downed crops picked up by the snout extension tool 20 to glide smoothly onto the conventional snout 12, 14 and into the combine head 11 without encountering any abrupt changes in direction. The angle of deflection is shown, for example, in FIGS. 14 and 15 as about 160 degrees, however, any other angles are contemplated and can be changed to accommodate various styles and types of conventional snouts, 14 or 12, of a combine head 11.

Figure 16A:
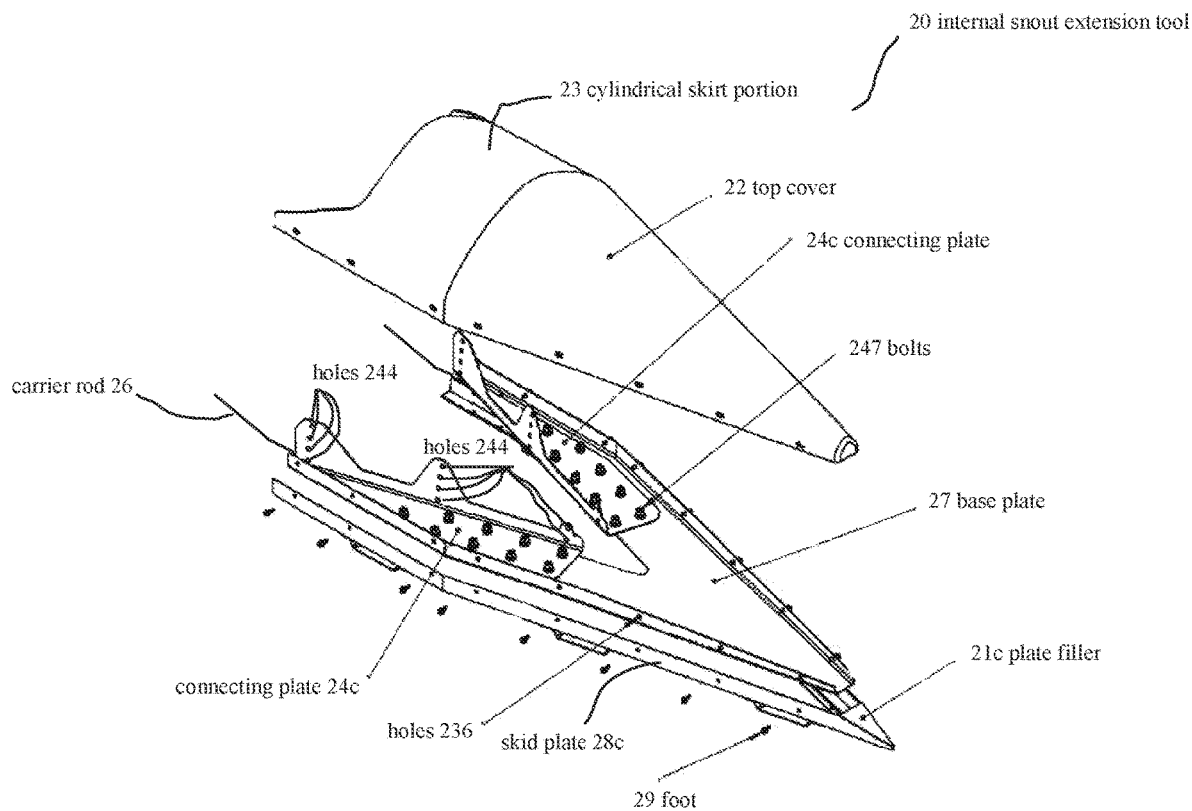
FIG. 16a shows a semi-exploded perspective view of another example embodiment of an example internal snout extension tool.
Figure 16B:
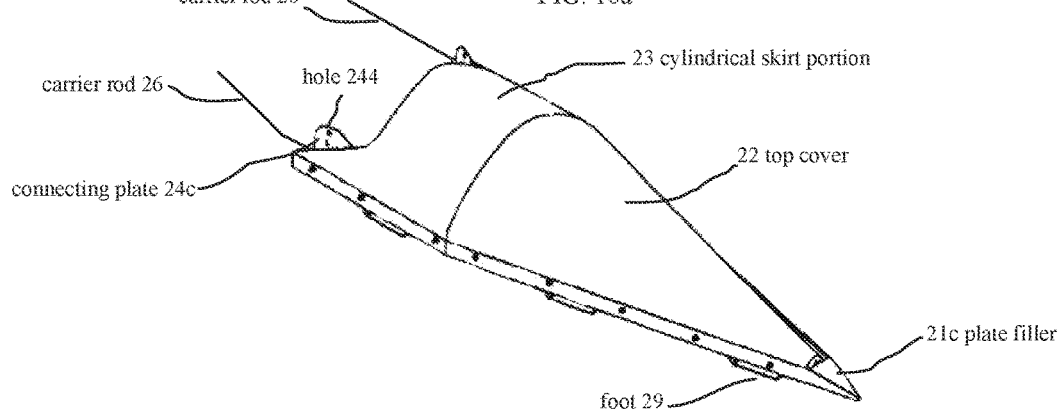
FIG. 16b is a perspective view of the example tool of FIG. 16a with all of the parts coupled together.

Another example embodiment of an internal snout extension tool 20 is illustrated in FIGS. 16-18. FIG. 16a shows a semi-exploded perspective view, where from top to bottom, the top cover 20 with the cylindrical skirt portion 23, the additional embodiment of the two connecting plates 24c, showing three raised portions, where the proximal raised portion has four holes 230, the center raised portion has four holes 230, and the distal raised portion has two holes 230 and wherein the connecting plates 24c are coupled with the carrier rods 26, the base plate 27, and the skid plate 28c with a plurality of feet 29. It is also noted that the skid plate 28c can also be produced without feet 29 (this example not shown). It is also noted that bolts 247 are shown in the connecting plate instead of the individual holes 230 on the base of the connecting plate 24c. The distal end of the skid plate 28c and the plate filler 21c can, but do not have to be angled downward to a point or approaching a point at the front end of the snout 20 as shown in FIG. 16a to enable the front end of the snout 20 to get under very low-laying stalks of downed crops. FIG. 16b is a perspective view of the example tool of FIG. 16a with all of the parts assembled together.

In FIGS. 17a-17d, various views of the example connecting plate 24c are shown. FIG. 17a shows a close-up of a perspective view of the connecting plate 24c.

FIG. 17b shows a side elevation view of the example connecting plate 24c on segment of the skid plate 28c having feet 29.

FIG. 17c shows a side elevation view of the example connecting plate 17a.

FIG. 17d shows the bottom plan view of the example connecting plate in FIG. 17a.

FIG. 18a shows a perspective view of the additional example embodiment of a skid plate 28c having a plate filler 21c that is angled downward on the distal end of the skid plate 28c.

FIG. 18b shows the bottom plan view of example embodiment in FIG. 18a.

FIG. 18c shows the side elevation view of the example embodiment in FIG. 18a.

FIG. 18d shows the bottom plan view of the example skid plate 28c without feet.

FIG. 18e shows the side elevation view of the example skid plate 28c.

FIG. 18f shows the top plan view of example plate filler 21c.

Figures 23A, 23B:
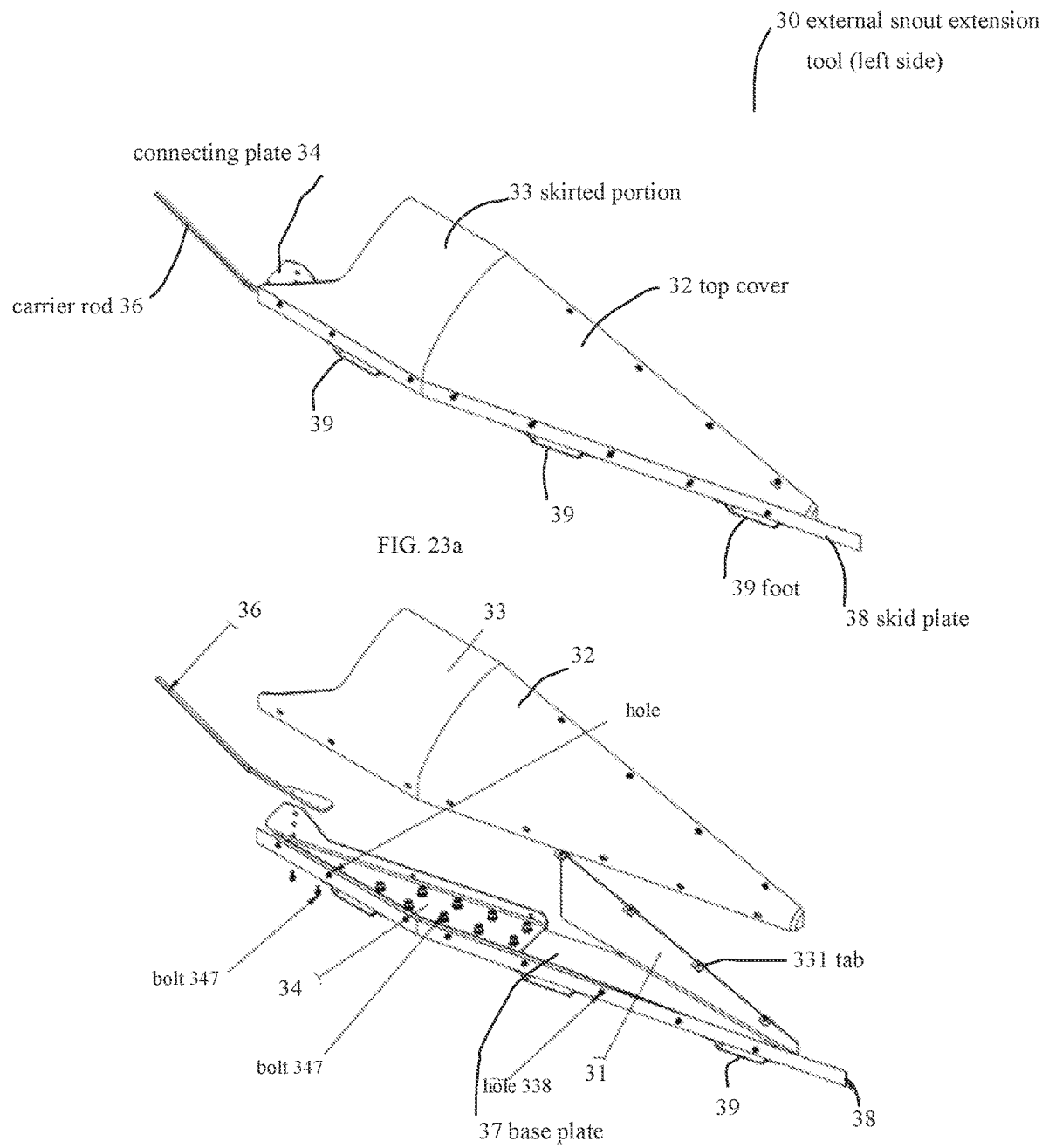

Agricultural Tool for Mounting onto an External Snout of a Combine Harvester External Left and Right Snout Extension Tools or Agricultural Tool In referring to FIG. 19 and FIG. 23, an exploded perspective view of the example right and left external snout extension tool 30 is shown on which the external snout extension tool 30 is to be mounted. From top to bottom is the top cover 32, with a semi-cylindrical skirt portion 33; an optional side cover 31 with a plurality of tabs 331 (however, more or less than 4 tabs as shown in the figure are contemplated); one connecting plate 34; one carrier rods 36; a base plate 37; and a skid plate 38 having optionally one or more feet 39. The top cover 32, the connecting plate 34, the base plate 37 with the carrier rods 36, and the skid plate 37 are all assembled together to form the external snout extension tool 30, and the snout extension tool 30 is then mountable on the conventional external snout 12 of the combine head 11 as shown in FIG. 1.

In one example embodiment, the top cover 32 and skirted portion 33 are made out of thermoplastic acrylic-polyvinyl chloride or an acrylic-polyvinyl chloride alloy. Other plastics are also contemplated, including but not limited to, polyvinyl chlorides, ABS (Acrylonitrile-Butadiene-Styrene), HDPE (High-Density Polyethylene), HMWPE (High Molecular Weight Polyethylene), Polycarbonate, Styrene, and UHMW (Ultra High Molecular Weight Polyethylene). In other embodiments, any or all of the top cover 32, side wall 31, skirted portion 33, tabs 331 connecting plate 34, carrier rods 36, or skid plate 38 may be made of metal or metal alloy or plastics.

The example top cover 32 is generally tapered or cone shaped extending from a proximal end at the skirted portion 33 to a distal end. The cone shaped portion of the top cover 32 tapers forwardly to the distal end, and the top cover 32 is hollow so as to conform to the rounded or semi-cylindrical shape of the conventional external snout 12.

It is to be noted that the external snout extension tool 30 and other example embodiments of the tool 30 can either be assembled first and then mounted on the snout 14 of the combine head 11, or the snout extension tool 30 components as shown in example FIG. 2 where the base plate may be assembled together with a skid plate and a connecting plate under the snout in a position wherein the base plate and the skid plate extend forward from the snout, positioning a top cover over the snout in a position above the base plate and the skid plate, wherein the top cover also extends forward from the snout over the base plate and the skid plate, fastening the base plate, the skid plate, and the connecting plate together with the cover plate; and fastening the connecting plate to the snout in a pivotal manner such that the snout extension tool is pivotal in relation to the snout about a horizontal axis that is transverse to a forward direction of travel of the combine.

Figure 20A:
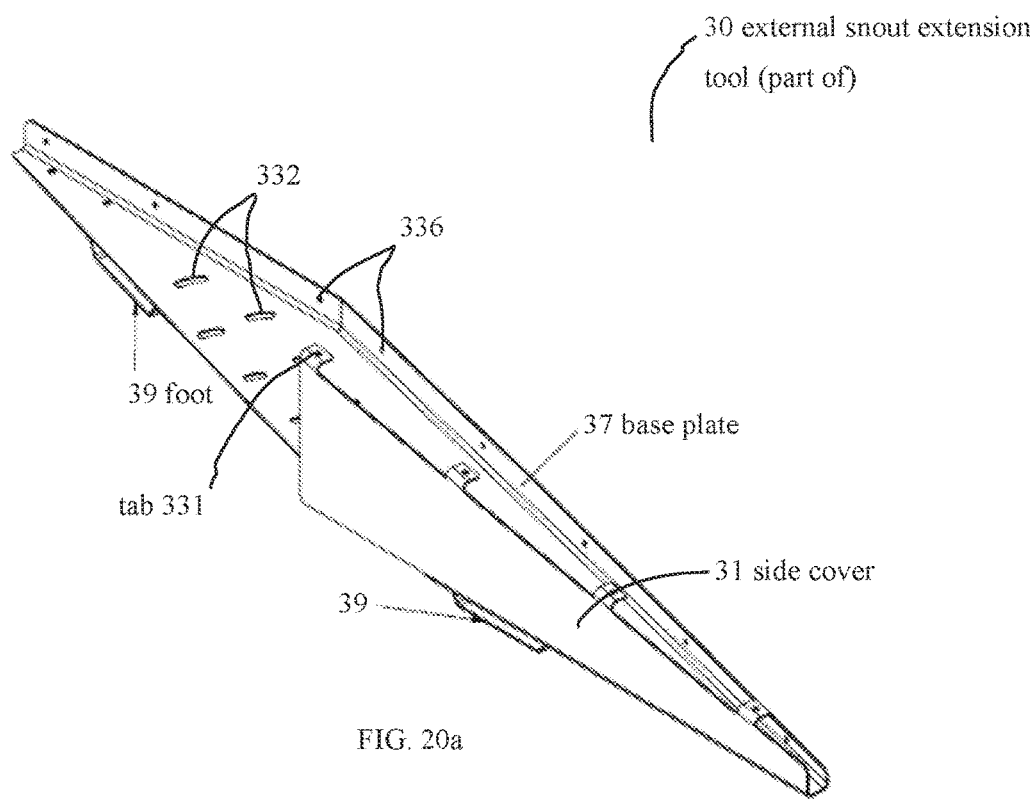
Figure 20B:
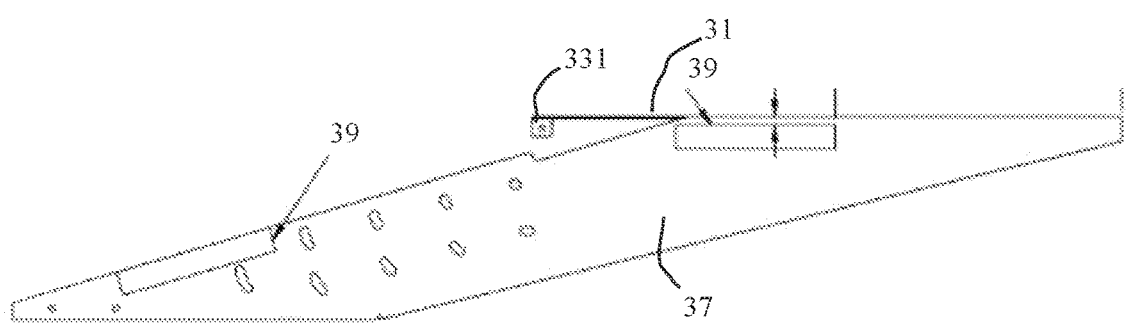

As seen in FIGS. 19-21 and FIGS. 23-25, the example connecting plate 34 has a plurality (e.g., nine) of holes 330 (covered by for example, hex bolts in the FIG. 19) in the base 340 of the plate 34. The side cover 31 is attachable to the base plate 37 and has one or more tabs 331 where the top cover 32 is attachable. The base plate 37 has a plurality of corresponding holes 332 (as shown in FIG. 20b) in alignment with the holes 230 in the connecting plate 34, so that the connecting plate 34 is attachable to the base plate 37 using, for example, but not limited to, hex head bolts, washers, nuts and lock washers through the aligning holes 330, 332. As also best seen in Figures FIGS. 19-21 and FIGS. 23-25, there are a plurality of holes 334 along the marginal bottom edge portion of the top cover 32, which correspond to and align with a plurality of holes 336 in lateral edge portions of the base plate 37. The lateral edge portions of the skid plate 38 also have a plurality of holes 338, which align with the holes 334 in the top cover 32 and with the holes 336 in the base plate 37. Accordingly, when the skid plate 38, the base plate 37 with the connecting plate 34 and the side cover 31, and the top cover 32 are assembled together, those components are fastened together with a plurality of bolts through those holes 334, 336, 338 in the respective components 31, 32, 37, 38 as best seen in FIGS. 19-21. Of course, persons skilled in the art will understand that other fasteners, spot welds, clips, detents, or any of myriad other known fastening or joining techniques can be used instead of the example bolts (such as those in 247) through the corresponding holes in the respective components.

When the external snout extension tool 30 is assembled, for example as described above, it can be mounted on any of the conventional external snouts 12 as shown in FIG. 1 as explained below. Referring now primarily to FIGS. 16-18, the connecting plate 34 has at least one hole 344 close to the proximal end of the connecting plate 34. For adjustability, a plurality (e.g., three) such holes 344 are provided. To mount the external snout extension tool 30 on a conventional external snout 12, a mating hole 246 can be provided, e.g., drilled, into each lateral side of the conventional external snout 14 in a location as shown, for example, in FIG. 2, where such mating holes (as shown in 246 of FIG. 2) align with the holes 344 in the connecting plate 34 when the external snout extension tool 30 is placed onto the conventional snout 12 as shown in FIG. 1. Mounting bolts such as those shown for example in 247 (see FIGS. 2, 5, 6, and 8) can then be inserted through the a hole 344 in the connecting plate 34 and through the corresponding holes such as shown in 246 for example, in the conventional external snout 12 to mount the external snout extension tool 30 in a pivotal manner onto the conventional external snout 12 so that the external snout extension tool 30 is pivotal about a horizontal axis defined by and extending through the mounting bolts. Any of the holes 344 in the connecting plate 34 can be selected for this mounting, depending on how far a user wants the proximal end of the external snout extension tool 30 to hang below the conventional external snout 12. With the external snout extension tool 30 mounted on the conventional external snout 12 in this manner, the top cover 32 and the side wall 31 of the external snout extension tool 30 rests on the surface of the conventional external snout 12. An appropriate adjustment of the proximal end of the external snout extension tool 30 in relation to the conventional external snout 12 using an appropriate setting with the holes 344 as explained above can, for example, set the skid plate 38 of the external snout extension tool 30 to be parallel to the ground regardless of any particular height or angle that the conventional external snout 12 may have in relation to the ground.

In use, as the combine 10 moves on the ground in the forward direction (see FIG. 1) to move the head 11 through a grain crop, for example corn (not shown), the external snout extension tool 30 glides along the ground on or just above the ground and picks up downed stalks of the grain a sliding action of the top cover surface on the stalks as the distal end of the skid plate 37 and the sloped, conical portion of the top cover 34 slip under the broken or bent stalks and guide such broken or bent stalks over and alongside the surface of the top cover 32 to the proximal end of the external snout extension tool 30. By the time the stalks reach the proximal end of the external snout extension tool 30, they are straightened stood upright enough for the conventional external snout 12 to continue guiding them into the gathering chains, snap rollers, or cutters (not shown) of the combine head 11 where the reaping operation of the combine 10 is completed. When the external snout extension tool 30 encounters uneven, rising ground as the combine 10 moves over the ground, the pivotal connection of the external snout extension tool 20 to the conventional external snout 12 as described above allows the external snout extension tool 30 to glide up and over such uneven, rising ground. Optional feet or wear pads 39 can be provided on the bottom of the skid plate 38.

For additional straightening and guidance, e.g., for shorter or weaker stalks that are downed, optional carrier rods 36 (see FIGS. 19 and 23) are provided on the external snout extension tool 30. As shown, for example, in FIGS. 19 and 23, the carrier rod 36 is mounted on the connecting plates 34 and extends rearward and upwardly from the lateral side of the proximal end of the external snout extension tool 30 for some distance along the side of the conventional external snout 12. The carrier rod 36 upholds and supports shorter and weaker stalks that might not be supported by the larger surfaces of the conventional external snout 12, effectively supporting and carrying them far enough alongside the conventional external snout 12 to reach and be captured by the gathering chains, snap rollers, or cutters (not shown) of the combine head 11.

Figure 20C:
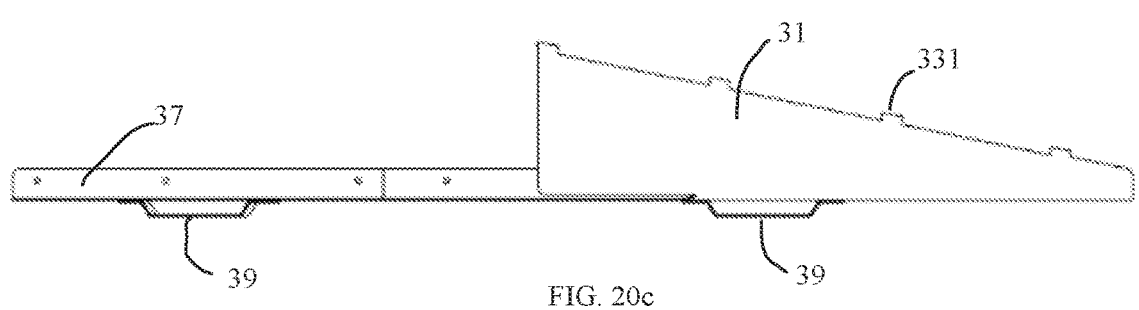

Referring again to FIGS. 19-21 and 23-25, some additional details can be provided as examples, but not for limitation. In one example embodiment, the snout extension tool 30 for mounting onto an individual external snout extension tool 30 has a base plate 37 somewhat diamond in shape to accommodate the substantially triangular shape of an individual conventional external snout 12 of a combine head 11. A side wall 31 is attachable to the base plate 37 and faces outward. The point (distal end) of the individual conventional snout 12 extends approximately halfway up the base plate 37. The sides of the base plate 27 are raised up to form edges around substantially the entire base plate 37. The base plate 37 has a total of nine holes on the flat surface, seven holes along the outer edge. Less or more than seven holes can be provided. These holes may be circular in shape or slotted in shape. FIGS. 20b and 20c shows the holes 330 as slotted in shape, which allows for more adjustability of the example snout extension tool 30 to be adapted to fit a variety of different conventional snouts 12, for example, as made by different combine manufacturers or as may be used on different combine heads 11. These holes are used for attaching a base plate 37 to a connecting plate 34 using for example but not limited to, hex head threads, washers, nuts and washer locks. Other components for attachment are also contemplated. On the raised edge, seven holes are shown, for attaching directly to the skid plate 38. Less or more than seven holes can be provided. These holes are used for attaching the base plate 37 directly to the skid plate 38 using for example but not limited to, hex head threads, washers, nuts and washer locks.

In another example embodiment, when the entire snout extension tool 30 is mounted onto an individual conventional snout 12, the snout extension tool 30 extends a minimum of 35 inches to 45 inches from the point of the individual combine head 13. This extension and the angle and length of the top cover 32 decrease the space between adjacent individual snouts 12, creating a "dam" and allowing the crops to run up to the combine rather than break or be left on the ground.

In another example embodiment, the snout extension tool 30 for mounting onto the individual external snout 12 of a combine 10 has a plurality of feet 39 on the bottom. The drawings show for example three generally rectangular shaped feet or wear pads, but more or fewer feet can be provided or none at all. Other shapes, such as square, can also be provided. One example purpose of the feet or wear pads 39 is to keep the skid plate 38 and the rest of the snout extension tool 30 off the ground and help prevent or minimize dirt from being pushed by the snout extension tool 30 which could cause undue stress and wear on the individual snouts 12 and other components or parts of the combine 10. Additionally, a large amount of dirt being pushed by the snout extension tool 30 could cause damage to the tool 30 by creating too much side draft, thus lateral stress or strain. The feet or wear pads 39 may be made as separate pieces and are mounted onto the skid plate 38, for example, by welding or other conventional joining technique. On the side of the skid plate 38 of one example embodiment, eight holes are shown. These holes are used for attaching the skid plate 38 directly to the base plate 37 and the top cover 32 and cylindrical skirt portion 33. Less or more than eight holes are contemplated.

Additional Embodiments

Another example embodiment includes a top cover 40 having one or more slots to be mounted onto an internal snout of a combine head 14. In referring to FIGS. 26a-26d, various views of a top cover with slots 41 are shown. FIG. 26a is a top perspective view of a top cover with slots 40 comprised of a top cover 42, a cylindrical skirt portion 43, and slots 41. The top cover 42 is generally cone shaped and has a skirted portion 43 that is cylindrical in shape. The cone shaped portion of the top cover 42 tapers forwardly and the top cover 42 is hollow, so as to mirror the shape of the individual internal combine heads 14. The top cover 42 also has several holes along the bottom edge on each side for attaching directly to a base plate 27 or a skid plate 28 using for example but not limited to, hex head threads, washers, nuts and washer locks. Other components for attachment are also contemplated. In FIG. 26a, eight holes are shown along the bottom edge of each side of the top cover 42, but more or less holes may be contemplated. Top cover 42 may be used in place of top cover 22 as previously discussed. Top cover 42 may also be made of material previously disclosed for top cover 22 and functions similar to top cover 22.

FIG. 26b shows the side perspective view of FIG. 26a, with the top cover 42, cylindrical skirt portion 43, and slots 41.

FIG. 26c shows the top plan view of FIG. 26a, with the top cover 42, cylindrical skirt portion 43, and slots 41.

FIG. 26d shows the rear elevation view of FIG. 26a, showing the top cover 42 and slots 41.

Another example embodiment includes a top cover 50 having one or more slots to be mounted onto an external snout of a combine head 12. In referring to FIGS. 27-28, various views of a top cover with slots 51 are shown. FIGS. 27a and 28b are a top perspective view of a top cover with slots 50 comprised of a top cover 52, a cylindrical skirt portion 53, and 51 slots. The top cover 52 is generally cone shaped and has a skirted portion 53 that is cylindrical in shape. The cone shaped portion of the top cover 52 tapers forwardly and the top cover 52 is hollow, so as to mirror the shape of the individual external snout of a combine head 12. The top cover 52 also has several holes along the bottom edge for attaching directly to a base plate 37 or a skid plate 38 using for example but not limited to, hex head threads, washers, nuts and washer locks. Other components for attachment are also contemplated. In FIG. 27c and FIG. 28c, eight holes are shown along the bottom edge of the top cover 52, but more or less holes may be contemplated. Top cover 52 may be used in place of top cover 32 as previously discussed. Top cover 32 may also be made of material previously disclosed for top cover 32 and functions similar to top cover 32.

FIG. 27b shows the side perspective view of the example top cover in FIG. 27a, with the top cover 52, cylindrical skirt portion 53, and slots 51.

FIG. 27c shows the top plan view of the example top cover in FIG. 27a, with the top cover 52, cylindrical skirt portion 53, and slots 51.

FIG. 27d shows the rear elevation view of the example top cover in FIG. 27a, showing the top cover 52 and slots 51.

FIG. 28b shows the side perspective view of the example top cover in FIG. 28a, with the top cover 52, cylindrical skirt portion 53, and slots 51.

FIG. 28c shows the top plan view of the example top cover in FIG. 28a, with the top cover 52, cylindrical skirt portion 53, and slots 51.

FIG. 28d shows the rear elevation view of the example top cover in FIG. 28a, showing the top cover 52 and slots 51.

In referring to FIGS. 29a-29d, an alternative example embodiment of a base plate 57 is shown. Base plate 57 may or may not attach to a connecting plate 24 or a skid plate 28. Base plate 57 is generally triangular in shape and has a triangular shaped cutout on the distal end, has raised edges substantially all along the edges and has a triangular shaped prominence on the inner surface of the proximal end having a raised portion with 3 vertical holes. Base plate 57 has about eight holes on each side of the raised edges for attaching directly to a top cover, 22 or 42. Base plate 57 may also be made of material previously disclosed for base plate 27 and functions similar to base plate 27.

FIG. 29b shows a top plan view of the example base plate in FIG. 29a.

FIG. 29c shows a side perspective view of the example base plate in FIG. 29a.

Example Regarding Crop Yield

The snout extension tool embodiments disclosed within, including but not limited to 20 and 30 can be used to increase the yield of a harvested crop, recovering up to 80% or greater of the downed crop.

It is appreciated that various modifications may be implemented with respect to the above described embodiments. Many modifications and variations of the present invention are possible in light of the above teachings. It is therefore to be understood that within the scope of the appended claims, the invention may be practiced otherwise than as specifically described.

Various embodiments of agricultural tools and methods thereof are described in detail herein. Alternative embodiments of such agricultural tools and methods of use will become obvious to those skilled in the art after reading this disclosure. It is intended for the appended claims to be construed broadly to cover such alternative embodiments, except to the extend limited by prior art.

The foregoing description of the embodiments has been presented for purposes of illustration and description. It is not intended to be exhaustive or to limit the invention to the precise form disclosed, and other modifications and variations may be possible in light of the above teachings. It is intended that the appended claims be construed to include other alternative embodiments except insofar as limited by the prior art. The embodiments of the disclosed agricultural tools assist the farmer in collecting as much of the crop as originally planted. For maximum efficiency in assisting of harvesting of crops, a plurality of the tools disclosed are mounted on as many combine heads as possible, including both the internal heads and the external heads. The embodiments of the agricultural tools can be made in different dimensions (length, width, and depth) in order to accommodate any differences in the combine heads of different combine harvester models.

What is claimed is:

1. A plurality of snout extension tools for extending a snout of a combine header comprising:

a base component with a substantially flat bottom surface and a length extending between a proximal end and a distal end with opposite lateral edges that converge toward each other at the distal end of the base component;

a cover component that arches over the base component and that has opposite lateral edges which extend from a proximal end of the cover component where the lateral edges of the cover component are at least as wide as the snout of the combine header and converge toward each other at a distal end of the cover component in a profile that conforms to the lateral edges of the base component, and wherein the lateral edges of the cover component are connected with the lateral edges of the base component so that the cover component and the base component have a space between them that is open adjacent to the proximal ends of the base component and the cover component and that converges toward the distal ends of the base component and the cover component, and, further, wherein the proximal end of the cover component arches over the base component a sufficient amount to provide the open proximal end of the space of a size that conforms substantially to the snout of the combine header; and connecting plates on opposite sides of the snout extension tool adjacent the proximal ends of the base component and the cover component with attachment means on the connecting plates on the opposite sides of the snout extension tool that are adapted to connect the snout extension tool to the snout of a combine in a pivotal manner that is pivotal about a horizontal axis.

2. A snout extension tool for mounting onto an internal snout of a combine harvester comprising:
 a hollow, generally cone-shaped top cover having a generally cylindrical skirt portion, wherein the cover tapers forwardly and wherein the top cover and the skirt portion have one or more slots of varying lengths;
 a base plate having a substantially triangular shape with a narrower distal end and a wider proximal end, wherein the proximal end of the base plate has a triangular shaped cutout and wherein the sides of the base plate are raised to form edges around substantially the entire base plate;
 at least one connecting plate attachable to the base plate;
 a skid plate having a substantially triangular shape, tapering to a point portion, wherein the point portion is covered by a flat triangular shaped plate filler, and wherein the skid plate has a plurality of feet attached to the bottom surface; and
 wherein said tool is coupled together with at least one carrier rod attached to a proximal end portion of the skid plate.

3. The tool of claim 2, wherein the top cover and skirt portion is comprised of thermoplastic acrylic-polyvinyl chloride.

4. The tool of claim 3, wherein the top cover and skirt portion are further spray coated with an ultraviolet protective coating.

5. The tool of claim 2, wherein the skid plate, the carrier rod, and the base plate are comprised of a metal or metal alloy.

6. A snout extension tool for mounting onto an external snout of a combine harvester comprising:
 a hollow, generally semi-cone-shaped top cover having a generally semi-cylindrical skirt portion, and wherein said cover tapers forwardly and wherein the top cover and skirt portion have one or more slots of varying lengths;
 a base plate having a substantially triangular shape with a narrower distal end and a wider proximal end wherein the proximal end of the base plate has a triangular shaped cutout and wherein the side of the plate is raised up to form edges around substantially the entire plate and wherein said base plate has a plurality of feet attached to the bottom surface;
 a connecting plate attachable to the base plate;
 wherein said tool is coupled together with at least one carrier rod attached to a proximal end portion of said plate; and
 a side cover attachable to the base plate.

7. The tool of claim 6, wherein said top cover and skirt portion are comprised of thermoplastic acrylic-polyvinyl chloride.

8. The tool of claim 6, wherein said top cover and skirt portion are further spray coated with an ultraviolet protective material.

9. The tool of claim 6, wherein the skid plate, the carrier rod, and base plate are comprised of a metal or metal alloy.

10. A method of assisting in the harvesting of agricultural crops comprising mounting a plurality of snout extension tools for mounting onto an internal snout of a combine harvester, wherein the snout extension tool comprises:
 a hollow, generally cone-shaped top cover having a generally cylindrical skirt portion, wherein the cover tapers forwardly and wherein the top cover and the skirt portion have one or more slots of varying lengths;
 a base plate having a substantially triangular shape with a narrower distal end and a wider proximal end, wherein the proximal end of the base plate has a triangular shaped cutout and wherein the sides of the base plate are raised to form edges around substantially the entire base plate;
 at least one connecting plate attachable to the base plate;
 a skid plate having a substantially triangular shape, tapering to a point portion, wherein the point portion is covered by a flat triangular shaped plate filler, and wherein the skid plate has a plurality of feet attached to the bottom surface;
 wherein said tool is coupled together with at least one carrier rod attached to a proximal end portion of the skid plate;
 driving the combine harvester through a field of downed agricultural crops, and harvesting the downed crops to form a yield of a downed crop.

11. The method of claim 10, wherein the yield is comprised of 80% or greater of the downed crop.

12. A method of extending a snout of a combine head to enhance reaping of downed crops, comprising:
 positioning a base plate assembled together with a skid plate and a connecting plate under the snout in a position wherein the base plate and the skid plate extend forward from the snout;
 positioning a top cover over the snout in a position above the base plate and the skid plate, wherein the top cover also extends forward from the snout over the base plate and the skid plate;
 fastening the base plate, the skid plate, and the connecting plate together with the cover plate; and
 fastening the connecting plate to the snout in a pivotal manner such that the snout extension tool is pivotal in relation to the snout about a horizontal axis that is transverse to a forward direction of travel of the combine.

13. A method of extending a snout of a combine head to enhance reaping of downed crops, comprising:
 positioning a base plate on a skid plate;
 positioning a connecting plate on the base plate and fastening the connecting plate to the base plate;
 positioning a top cover over the base plate, skid plate, and connecting plate;
 assembling and fastening the top cover, the base plate, the skid plate, and the connecting plate together as a unitary snout extension tool;
 mounting the unitary snout extension tool on a front portion of the snout so that the front portion of the snout is positioned between the top cover and the base plate with a front portion of the unitary snout extension tool extending forward from the front portion of the unitary snout extension tool; and
 connecting the connecting plate to the snout in a pivotal manner such that the snout extension tool is pivotal in relation to the snout about a horizontal axis that is transverse to a forward direction of travel of the combine.

\* \* \* \* \*